(12) United States Patent
Skipp et al.

(10) Patent No.: US 11,210,950 B2
(45) Date of Patent: Dec. 28, 2021

(54) DETERMINING ROAD SAFETY

(71) Applicant: Ford Global Technologies, LLC, Dearborn, MI (US)

(72) Inventors: David Skipp, Brentwood (GB); Jonathan Scott, Chelmsford (GB); John Lippe, Westcliff on Sea (GB); Giuseppe Calo, Stratford (GB); Daniel Gimeno Ferrer, Brentwood (GB); Yu Chen, Belleville, MI (US); Arnold Babila, Ann Arbor, MI (US); Junheung Park, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 16/804,967

(22) Filed: Feb. 28, 2020

(65) Prior Publication Data
US 2021/0074160 A1 Mar. 11, 2021

(30) Foreign Application Priority Data

Sep. 11, 2019 (GB) ..................................... 1913089

(51) Int. Cl.
*G08G 1/16* (2006.01)
*B60Q 9/00* (2006.01)
(Continued)

(52) U.S. Cl.
CPC .............. *G08G 1/16* (2013.01); *B60Q 9/008* (2013.01); *B60W 50/045* (2013.01);
(Continued)

(58) Field of Classification Search
CPC ...... G08G 1/16; G08G 1/0133; G08G 1/0112; G08G 1/165; G08G 1/0129; G08G 1/0141;
(Continued)

(56) References Cited

U.S. PATENT DOCUMENTS 9,805,601 B1 * 10/2017 Fields ..................... H04W 4/44
2016/0042644 A1 2/2016 Velusamy
(Continued)

FOREIGN PATENT DOCUMENTS

GB 2539470 A 12/2016

OTHER PUBLICATIONS

European Patent Application No. GB1913089 7, Combined Search and Examination Report under Sections 17 and 18 (3), dated Feb. 28, 2020 (4 pages).

*Primary Examiner* — Rodney A Butler
(74) *Attorney, Agent, or Firm* — Brandon Hicks; Eversheds Sutherland (US) LLP

(57) ABSTRACT

A controller for a vehicle is configured to determine a driving behaviour of a first vehicle and a second vehicle. The controller is configured to receive data relating to at least one of a flow of traffic at the given location and a geography at the given location. If the controller determines that the driving behaviour of the first vehicle and the driving behaviour of the second vehicle are similar and the controller determines that at least one of the flow of traffic at the given location departs from a normal traffic flow and the geography at the given location increases the risk of accident, then the controller is configured to issue an alert.

20 Claims, 13 Drawing Sheets

(51) Int. Cl.
*B60W 50/04* (2006.01)
*B60W 50/14* (2020.01)
*B60W 60/00* (2020.01)
*G05D 1/02* (2020.01)
*G07C 5/02* (2006.01)
*G08G 1/01* (2006.01)
*G08G 1/09* (2006.01)
*B60W 50/08* (2020.01)
*G08G 1/0962* (2006.01)

(52) U.S. Cl.
CPC .......... *B60W 50/085* (2013.01); *B60W 50/14* (2013.01); *B60W 60/0015* (2020.02); *G05D 1/0214* (2013.01); *G07C 5/02* (2013.01); *G08G 1/0129* (2013.01); *G08G 1/0141* (2013.01); *G08G 1/0145* (2013.01); *G08G 1/0962* (2013.01); *G08G 1/164* (2013.01); *G08G 1/166* (2013.01); *G05D 2201/0213* (2013.01)

(58) Field of Classification Search
CPC .... G08G 1/0145; G08G 1/0962; G08G 1/164; G08G 1/166; G08G 1/163; G08G 1/0116; G08G 1/0965; G08G 1/096827; G05D 1/0214; G05D 2201/0213; G07C 5/02; B60Q 9/008; B60W 2556/45; B60W 40/04; B60W 40/10; B60W 40/105; B60W 40/12; B60W 30/08; B60W 60/0015; B60W 50/045; B60W 50/085; B60W 50/14
See application file for complete search history.

(56) References Cited

U.S. PATENT DOCUMENTS

| | | |
|---|---|---|
| 2016/0093210 A1 | 3/2016 | Bonhomme |
| 2017/0057411 A1 | 3/2017 | Heath et al. |
| 2018/0189913 A1* | 7/2018 | Knopp ................. G06Q 40/08 |
| 2019/0051162 A1* | 2/2019 | Malkes ................. G08G 1/081 |
| 2020/0242922 A1* | 7/2020 | Dulberg ................ G08G 1/164 |

* cited by examiner

DETERMINING ROAD SAFETY

CROSS-REFERENCE TO RELATED APPLICATIONS

The present disclosure claims priority to and the benefit of GB Application No. 1913089.7, filed Sep. 11, 2019, which is hereby incorporated by reference herein in its entirety.

FIELD

The present disclosure relates to a method and apparatus for determining road safety. In one example, the method relates to determining road safety at a particular location based on certain performance parameters one or more vehicles being operated at or near that location that may indicate how the vehicles are being driven.

BACKGROUND

Road safety is an important concern for many cities across the world, some of which have shown, or are showing, an increased commitment to reducing the number of road-related accidents and injuries. However, some cities may not have adequate resources to address safety concerns at every location within their cities. In particular, it may be difficult for some cities to identify the areas of higher risk to traffic accidents (for example, so as to reduce the risk of future accidents in that location). Reducing death and serious injury on roads remains both difficult to achieve and a high priority for many areas.

SUMMARY

Identifying the areas in a city of high accident risk may be beneficial towards reducing the number of injuries and fatalities in that city. Some of examples of the disclosure presented herein relate to monitoring a performance parameter of a vehicle in a given location, and, when it is determined that the performance parameter is greater than, or less than, an acceptable threshold, an alert may be issued to give warning that an accident is likely. Consequentially, the alert may indicate that the given location is more susceptible to accidents.

According to one example of the present disclosure there is provided a method comprising: selecting a first location from a set of locations, analysing, by a processor, data collected from a first vehicle located within a first distance of the first location, generating a first value representative of a first parameter of the first vehicle, comparing the first value with a first threshold, and depending on whether the first value is greater than or less than the first threshold, issuing an alert.

Therefore, according to an example of the disclosure, a performance parameter of a vehicle in a given location is monitored and compared to an acceptable threshold. If the parameter is greater than (for certain parameters that, in some examples may include brake pedal pressure) or less than (for certain parameters that, in some examples, may include accelerator pressure) a threshold then it may be determined that there is a higher probability, or risk of, an accident in that location. For example, higher braking pressure than expected (e.g. relative to the first location) may suggest emergency braking. For example, lower accelerator pressure than expected may suggest that the driver feels that the conditions are not safe.

For example, the alert may be issued when the first value is greater than the first threshold. Accordingly, in one example there is provided a method comprising: selecting a first location from a set of locations, analysing, by a processor, data collected from a first vehicle located within a first distance of the first location, generating a first value representative of a first parameter of the first vehicle, comparing the first value with a first threshold, and, when the first value is greater the first threshold, issuing an alert.

For example, the alert may be issued when the first value is less than the first threshold. Accordingly, in one example there is provided a method comprising: selecting a first location from a set of locations, analysing, by a processor, data collected from a first vehicle located within a first distance of the first location, generating a first value representative of a first parameter of the first vehicle, comparing the first value with a first threshold, and, when the first value is less than the first threshold, issuing an alert.

The parameter(s) may be performance parameters of the vehicle as will be explained below.

The alert may be a safety alert.

According to an example of the disclosure there is provided a method comprising: selecting a first location from a set of locations, analysing, by a processor, data collected from a first vehicle located within a first distance of the first location, generating a first value representative of a first performance parameter of the first vehicle, generating a second value representative of a second performance parameter of the first vehicle, comparing at least one of the first and second vales with a first threshold and, when one of the first and second values is greater than the first threshold, issuing a safety alert.

The first parameter may be at least one of: the brake pedal pressure of the first vehicle, the speed of the first vehicle, the speed of the first vehicle engine, the steering wheel angle of the first vehicle, the rate of change of steering wheel angle of the vehicle, the accelerator pressure of the first vehicle, the state of at least one indicator of the first vehicle, the gear of the first vehicle, and the first vehicle type.

Therefore, according to an example of the disclosure, at least one performance parameter of a vehicle in a given location is monitored and compared to an acceptable threshold. If the parameter is greater than a threshold then it may be determined that there is a higher probability, or risk of, an accident in that location.

In some examples the threshold may be dependent on the location. For example, the parameter may be vehicle speed and the associated vehicle speed threshold may be a maximum speed threshold that may be the local speed limit of the first location. In another example, the location may be at, or near, a school and the vehicle speed threshold may be a lower speed limit.

The method may further comprise generating a plurality of values, wherein each value of the plurality of values is representative of a parameter of the first vehicle, and wherein the first value is one of the plurality of values, comparing each one of the plurality of values to a respective threshold value, and depending on whether each one of the values is greater than (in some examples, less than) its respective threshold, issuing an alert.

Each value of the plurality may be one of: the brake pedal pressure of the first vehicle, the speed of the first vehicle, the speed of the first vehicle engine, the steering wheel angle of the first vehicle, the accelerator pressure of the first vehicle, the state of at least one indicator of the first vehicle, the gear of the first vehicle, and the first vehicle type.

Therefore, in some examples of the disclosure, more than one parameter is monitored and each parameter is compared to an associated threshold. In such examples, an alert may be issued when both parameters exceed, or fall short of, their respective parameters. For example, one parameter may be brake pedal pressure (e.g. the first parameter in the method descried above-consequentially in this example the first value may be a brake pedal pressure value and the first threshold may be a brake pedal pressure threshold). In this example, however the method may also monitor the vehicle speed and the engine speed. For example, the data collected from the first vehicle comprises brake pedal pressure data, vehicle speed data, and engine speed data. In this example, the method may further comprise: generating a vehicle speed value representative of the speed of the first vehicle, generating an engine speed value representative of the engine speed of the first vehicle, comparing the vehicle speed value to a vehicle speed threshold, comparing the engine speed value to an engine speed threshold; and, when the brake pedal pressure value is greater than the brake pedal pressure threshold and/or the vehicle speed value is greater than the vehicle speed threshold and/or the engine speed value is greater than the engine speed threshold, issuing a safety alert.

In this example, therefore, the safety alert is issued when at least one of a number of parameters (three, in this example) are greater than their respective thresholds. In this example the brake pedal pressure threshold, the vehicle speed threshold, and engine speed threshold are maximum thresholds. In this example, the alert is issued when both the vehicle and engine speeds are determined to be above a maximum acceptable level but in combination with the brake pedal pressure being below a minimum acceptable level—this combination could indicate that a vehicle is begin drive at high speeds with the operator not showing any signs of slowing the vehicle. In one scenario, if the first location, is a school or proximate a junction where cornering and/or slowing is expected then the alert may be issued. In another scenario, if the first location is on a city freeway or highway where the vehicle is expected to be travelling fast then an alert may not be issued. Hence, the whether the alert is issued may, in some examples, be dependent on the first location.

The first threshold may be determined, and/or adjusted, based on one of the generated values. For example, a brake pressure threshold may be dependent on the vehicle speed or engine speed and, in this example, the brake pressure threshold may be determined, and/or adjusted, based on the determined speed of the vehicle or engine.

The alert may be issued in real-time or near real-time. The alert may be issued to the driver of the first vehicle, or is issued at a location remote from the vehicle.

This allows the driver of the vehicle to be issued with a warning—for example an audible warning—that they are operating the vehicle in an unsuitable way for the vehicle's location (in one of the examples above, driving too fast for a school zone).

In some examples therefore the vehicle may comprise an alert device to issue the warning signal, e.g. to an occupant of the vehicle. In other examples the alert may be issued at a remote location. The remote location could comprise, for example, a police station. This could alert police to the high probability of an accident occurring in that location due to the behaviour of the driver of the first vehicle and police could go to the first location or mark the first location as a 'higher probability risk area'.

In other examples, the alert may be issued to a traffic controller which is configured to control traffic signals in the region of the first location. For example, the vehicle may be operated at a speed exceeding a maximum speed threshold and the alert may be issued to a traffic controller which, in one example, could change the traffic signals in the first location to be red to try and force traffic to a stop to prevent an accident.

In other examples, the alert may be issued to a remote processor that can flag that location as an area of higher probability of accident. The processor may be part of, or in communication with, a database for storing locations at which alerts have been issued.

Selecting the first location from the set of locations may comprise: analysing, by a processor, location data collected from a monitoring service of a computing system, the location data comprising a set of location data points, generating, for each location data point in the location data, a location value representative of a first location parameter of the location data, comparing each location value with a first location threshold to determine the set of location data points that have a location value greater than, or less than, the first location threshold, and selecting one of the location data points that has a location value greater than, or less than, the first location threshold as the first location.

Therefore, in some examples, the method may select the first location based on locations which have a higher percentage of accidents, e.g. based on historical data. Such examples allow driver behaviour to be correlated with, e.g. known accident "hotspots", since the first location may be a location where a plurality of parameters exceed, or fall short of, acceptable thresholds and therefore vehicle parameters in this area are monitored to assess the level of accident risk in an already accident-prone area.

In other examples, weather data may be used to select the first location (e.g. locations experiencing heavy rain and/or wind) and/or traffic data may be used (e.g. locations may be selected that are experiencing heavy traffic).

The location data point in the set of location data points having a location value exceeding the first location threshold that is the closest in distance to the location of the first vehicle may be selected as the first location.

The first location parameter may be at least one of: the number of traffic accidents that have occurred at each location data point, the average severity of the traffic accidents that have occurred at that location data point, the traffic data at that location data point, the weather at that location data point, the time of day, the road surface at that location data point.

In one example, the method may further comprise: generating, for each location data point in the location data, a plurality of values, wherein each one of the plurality of values is representative of a location parameter of the location data, the location value being one of the plurality, comparing each one of the plurality of values to a respective threshold, and wherein selecting the first location is based on the comparison.

The method, in one example, may further comprise: generating a second value representative of a second parameter of the first vehicle, comparing the second value with at least one of: the behaviour of at least one vehicle within a second distance of the first vehicle and the behaviour of at least one pedestrian within a third distance of the first vehicle, and wherein the alert is issued based on the comparison of the second value.

Therefore, some examples may compare the vehicle behaviour to pedestrian behaviour, or to the behaviour of another vehicle, and issue an alert based on both. For example, the other vehicle may be a ridden vehicle (for example, a bicycle) and the comparison may (for example) be based on at least one of: the proximity of the ridden vehicle to the first vehicle and the speed of the ridden vehicle.

The pedestrian (or other vehicle) behaviour could be monitored by, e.g., a smartphone which may send data comprising pedestrian behaviour (for example, proximity to the road, walking speed, etc.) for comparison with the first vehicle parameters. This comparison may be performed in real-time or near real-time The method may further comprise transmitting data collected from a first vehicle to a second vehicle. The method may further comprise transmitting data collected from a second vehicle to a first vehicle. In this way, data may be shared between two vehicles and the behaviour of the two vehicles may be compared by the driver's themselves. In other examples, vehicle data may be sent to a remote location.

In one example, the method may further comprise: analysing, by a processor, data collected from a second vehicle located within a third distance of the first location, generating a second value representative of the first parameter of the second vehicle, comparing the second value with the first threshold; and depending if the first and second values are both greater than (in some examples, less than) the first threshold, issuing an alert.

The method may, in one example, further comprise: generating a first plurality of values, wherein each value of the first plurality is representative of a first parameter of the first vehicle, and wherein the first value is one of the first plurality, generating a second plurality of values, wherein each value of the second plurality is representative of a second parameter of a second vehicle, the second vehicle being within a fourth distance of the first location, comparing each one of the first and second pluralities of values to a respective threshold value, and depending if each one of the values is greater than (in some examples, less than) its respective threshold, issuing an alert.

Each value of the first and second pluralities may be one of: the brake pedal pressure of the first vehicle, the speed of the first vehicle, the speed of the first vehicle engine, the steering wheel angle of the first vehicle, the rate of change of the steering wheel angle of the first vehicle, the accelerator pressure of the first vehicle, the state of at least one indicator of the first vehicle, the gear of the first vehicle, and the first vehicle type.

Therefore, some examples of the disclosure are able to compare behaviour between two vehicles in a similar location (e.g. two vehicles within a certain distance of the first location). For example, behaviour may be compared between two vehicles in the same location in the same time.

For example, a first vehicle may be being operated at a first vehicle speed that exceeds a maximum threshold and a second vehicle may be operated at a second vehicle speed that exceeds a maximum threshold, and an alert may be issued (e.g. to the driver of at least one of the vehicles, e.g. both) as this may be determined to be a high risk situation. For example, the two vehicles may be both approaching the same location at high speeds and therefore there may be a high probability of the vehicles colliding at this location.

This location may then be logged (e.g. in a database) as a location of higher accident probability, having been determined as such based on the instance of two vehicles being operated at high speeds.

In one example, a location associated with a minimum number of alerts (e.g. two) may be logged as a "high-risk" location.

The method may comprise assigning a level of traffic safety to the first location, e.g. if an alert is issued. The method may comprise storing the first location in a database, e.g. if an alert is issued. Therefore, the method may allow the first location to be logged if it is determined that it is a higher risk location based on the behaviour of the first vehicle.

According to another example of the present disclosure there is provided a processing apparatus comprising: a location module configured to select a first location from a set of locations, a processor configured to analyse data collected from a first vehicle located within a first distance of the first location, and an analytics module configured to generate a first value representative of a first parameter of the first vehicle, and configured to comparing the first value with a first threshold; and configured to issue an alert depending on whether the first value is greater than (in some examples, less than) the first threshold.

The analytics module may be configured to generate a plurality of values, wherein each value of the plurality is representative of a parameter of the first vehicle, and wherein the first value is one of the plurality, configured to compare each one of the plurality of values to a respective threshold value; and configured to issue an alert depending on whether each one of the values is greater than (in some examples, less than) its respective threshold.

The first parameter may be brake pedal pressure and the first value is a brake pedal pressure value and the first threshold is a brake pedal pressure threshold, and wherein the analytics module is configured to: generate a vehicle speed value representative of the speed of the first vehicle, generate an engine speed value representative of the engine speed of the first vehicle, compare the vehicle speed value to a vehicle speed threshold, compare the engine speed value to an engine speed threshold, and, issue an alert when the brake pedal pressure value is less than the brake pedal pressure threshold and the vehicle speed value is greater than the vehicle speed threshold and the engine speed value is greater than the engine speed threshold.

The analytics module may be configured to issue the alert in real-time or near real-time. The analytics module may be configured to issue an alert to the driver of the first vehicle, or at a location remote from the vehicle.

The processor is a first processor, the apparatus further comprising a second processor configured to analyse location data collected from a monitoring service of a computing system, the location data comprising a set of location data points; and wherein the analytics module is a first analytics module, the apparatus further comprising a second analytics module configured to: generate, for each location data point in the location data, a location value representative of a first location parameter of the location data, compare each location value with a first location threshold to determine the set of location data points that have a location value greater than, or less than, the first location threshold, and select one of the location data points that has a location value greater than, or less than, the first location threshold as the first location.

The analytics module may be configured to: generate, for each location data point in the location data, a plurality of values, wherein each one of the plurality of values is representative of a location parameter of the location data, the location value being one of the plurality, compare each one of the plurality of values to a respective threshold, and to select the first location based on the comparison.

The analytics module is configured to: generate a second value representative of a second parameter of the first vehicle, compare the second value with at least one of: the behaviour of at least one vehicle within a second distance of the first vehicle and the behaviour of at least one pedestrian within a third distance of the first vehicle, and to issue the alert based on the comparison of the second value.

The processing apparatus may further comprise a processor configured to analyse data collected from a second vehicle located within a third distance of the first location; and wherein the event analytics module is configured to: generate a second value representative of the first parameter of the second vehicle, compare the second value with the first threshold, and to issue an alert depending on whether the first and second values are greater than (in some examples, less than) the first threshold.

The analytics module may be configured to: generate a first plurality of values, wherein each value of the first plurality is representative of a first parameter of the first vehicle, and wherein the first value is one of the first plurality, generate a second plurality of values, wherein each value of the second plurality is representative of a second parameter of a second vehicle, the second vehicle being within a fourth distance of the first location, compare each one of the first and second pluralities of values to a respective threshold value, and issue an alert depending on whether each one of the values is greater than (in some examples, less than) its respective threshold.

The processing apparatus may comprise a database for storing locations at which alerts have been issued.

According to another example of the present disclosure there is provided a non-transitory machine-readable storage medium, encoded with instructions executable by a processor, the machine-readable storage medium comprising instructions to cause the processor to perform the method as described above.

According to another example there is provided a method comprising: analysing, by a processor, location data collected from a monitoring service of a computing system, the location data comprising a set of location data points, generating, for each location data point in the location data, a location value representative of a first location parameter of the location data, comparing each location value with a location threshold to determine the set of location data points that have a location value greater than, or less than, the first location threshold; and issuing an alert when one of the location values exceeds the location threshold.

The alert may be issued in real-time or near real-time. The first location parameter may be at least one of: the number of traffic accidents that have occurred at each location data point, the average severity of the traffic accidents that have occurred at that location data point, the traffic data at that location data point, the weather at that location data point, the time of day, the road surface at that location data point. In other examples, a plurality of locations values may be generated and compared with a respective threshold, each value may correspond to a different location parameter.

This example therefore allows a set of locations to be monitored and an alert to be issued when one, or more, values exceeds, or falls below, an acceptable threshold.

For example, an alert may be issued when the average accident severity at a location, or set of locations, is above an acceptable maximum threshold; and/or an alert may be issued when the amount of accidents occurring at a location, or set of locations, is above an acceptable maximum threshold.

Identifying the areas in a city of high accident risk may be beneficial towards reducing the number of injuries and fatalities in that city. Some examples herein relate to identifying an accident risk at a particular location based on vehicle data, and at least one of traffic data and road (or geographic data). In some examples, the accident risk is identified additionally based on accident information (e.g. data relating to accidents at the particular location). Some examples of this disclosure relate to correlating these parameters to determine whether a particular location is at risk of accident, and, if it is, whether this is known (e.g. to drivers or local authorities). An alert may be issued depending on whether a particular location is at risk of accident and the alert may be issued based on whether this is known, for example if data indicates that it is known that a particular location is at risk of accident an alert may not be sent as, in this case it may be assumed that the location will be under investigation. In this way only unknown locations may be flagged for review and/or investigation.

In this way, observable and measurable behaviours can be used to design and monitor intervention strategies to objectively lower the probability of future accidents at any given location. For example, some examples herein (as above) relate to identifying those areas that may be at risk of accident (where this is not known, e.g. to a local authority) and alerting (e.g. a local authority) the risk of accident at these areas. In this way a system may be able to build up a picture of accident hotspots, previously unknown, with a view to contributing to a goal of lowering the rate of accidents in a wider area, for example a suburban or metropolitan area such as a town, city, state etc.

Some examples of the disclosure herein relate to monitoring the behaviour of at least two vehicles to determine whether they are behaving similarly. In some instances similar behaviour may indicate normal driving behaviour (e.g. both vehicles being driven at substantially the speed limit) but in other examples a similar driving behaviour may indicate that the vehicles are reacting to a potential cause of an accident. For example, one or a combination of vehicle parameters of both vehicles may indicate that both vehicles are swerving so as to avoid something on or near the road. At least one of the normal traffic flow in the vicinity of the location of the two vehicles or the geography (or road data) may be examined to determine whether the traffic flow is different from a normal traffic flow or if there is an obstacle in the road that is causing the accident. For example, it may be determined that there is a tree near the two drivers, suggesting that a branch may have fallen or that the tree may be overgrown causing different driver behaviour. In another example, if the traffic flow is different to normal then this may indicate that the two drivers are following a similar pattern to other drivers and that they are avoiding something—for example the traffic flow may be indicating that each driver is U-turning suggesting that there is a blockage in the road. In some examples, both the traffic flow data and the geographic data may be examined to conclude that there is a cause of the driver behaviour. For example, the traffic data may indicate a departure from normal in that drivers are avoiding part of a nature strip (e.g. a strip of kerb or sidewalk adjacent, or in the middle of, a road containing dirt, soil, grass, plants, trees etc.) and geographic data may indicate that there is a sign close to the part of the nature strip that the drivers appear to be avoiding, suggesting that the sign may have fallen down, and therefore that the location may need investigation. In each of these examples, it is determined that the location at which the vehicles are travelling (which may be an area around the vehicles) may be at risk of accident and an alert may be issued to flag the location. In some examples, historical data is examined to determine whether there was an historical accident proximate the area and, in this way, to determine whether a local authority is aware of that particular location being a known accident hotspot. For example, if the location is flagged as potentially dangerous and it is determined that there is associated accident data at that location then the matter may be taken no further as it is assumed, based on the presence of the historical accident data, that the location being potentially dangerous is known. On the other hand, if no historical accident data is found at a location flagged as potentially dangerous then an alert may be issued—in this case the alert representing a warning to a local authority to investigate the location.

According to one example there is provided a controller for a vehicle, the controller being configured to receive data relating to a first performance parameter of a first vehicle at a given location to determine a driving behaviour of the first vehicle, and data relating to a second performance parameter of a second vehicle at the given location to determine a driving behaviour of the second vehicle. The controller is also configured to receive data relating to at least one of a flow of traffic at the given location and a geography at the given location. If the controller determines that the driving behaviour of the first vehicle and the driving behaviour of the second vehicle are the same, or similar within a predetermined first threshold, and the controller determines that at least one of the flow of traffic at the given location departs from a normal traffic flow and the geography at the given location increases the risk of accident, then the controller is configured to issue an alert.

In this way, the behaviour of two drivers is monitored at a given location (for example approaching an intersection). If the two drivers are behaving similarly then traffic flow data and/or geographical data are examined to determine whether there is a probable cause of the similar driver behaviour. For example, a deviation from the normal traffic flow may indicate a potential accident risk and/or an obstacle in the local geography of the location may indicate a potential accident risk. Alternatively, if the flow traffic pattern does not indicate a departure from normal and there is nothing in the road geography that would suggest an accident then it may be concluded that the two drivers' similar behaviour is isolated and/or coincidental and an alert may not be issued in this case. In this latter example, this data may indicate that the two vehicles are driving normally (albeit similarly) through a safe location.

For traffic flow data, remotely mounted cameras may have a clear view of a particular location (e.g. the road space thereof) and can use image recognition software and machine learning techniques to build a picture of the traffic flow through the given location.

For geographical data this may comprise road layout information (e.g. whether there are any kerbs, signage, markings, etc.) and/or information on the wider environment (including trees, buildings etc.) and/or broader location information (including gradients, sight lines, orientation to sun, road lighting) etc. Whereas a normal flow of traffic at a given time may provide an explanation for the driver behaviour that may be temporary for example due to a broken down vehicle, geographical data may provide a "local" and more permanent reason for the driver behaviour, such as poor sight lines, lighting, or sun exposure etc.).

The controller is configured to receive data relating to accidents that have occurred within a predetermined threshold (e.g. a second threshold) of the given location. The controller may be configured to determine whether an accident has occurred within the predetermined (second) threshold. In these examples, the threshold may be a distance, for example a radius from the given location (or a centre thereof). In this example the data may relate to all accidents that have occurred within a predetermined radius of the given location. In another example the threshold may be a temporal threshold. In this example the data may relate to all accidents that have occurred within a maximum travel time (e.g. 10 mins away at the local speed limit(s)) from the given location. In these examples, the controller is configured to take into account whether there have been any known accidents in the area and to issue an alert on this basis. In these examples, the accident data may allow an understanding of where, when, and/or under what conditions accidents have occurred in the past which can aid in an understanding of where they are likely to occur in the future.

Accordingly, the accident data may comprise metadata describing the position (e.g. by GPS coordinates) and the time, date etc. of the accident that has occurred.

The controller is configured to issue the alert to at least one of: a local authority, a fleet manager (e.g. of the first and/or second vehicle), a driver of a vehicle (e.g. the first and/or second vehicle).

The controller may be configured to issue the alert based on whether an accident has occurred within the predetermined threshold. For example, if the controller determines that an accident has not occurred within the predetermined threshold then the controller may be configured to issue the alert. In this example, the alert may be issued to a local authority as this may represent the instance where a local authority is unaware of the given location being a potential accident hotspot (as there is no historical accident data associated with that location) and so the alert essentially flags to the local authority that the given location should be investigated. Alternatively, if the controller determines that an accident has occurred within the predetermined threshold then the controller is configured to issue the alert. In this example, the alert may be issued to a driver (e.g. a driver of the first and/or the second vehicle) as this may represent the first and/or second drivers heading towards a potentially dangerous location.

The alert may comprise metadata describing the accident that has occurred within the predetermined threshold. This may allow the driver and/or local authority to make an informed decision as to whether to further investigate the given location etc.

At least one (or both) of the first and second performance parameters comprises at least one of: brake pedal pressure, speed, engine speed, the steering wheel angle, rate of change of input to the accelerator pedal, rate of change of position of the accelerator pedal, rate of change of steering wheel angle, the gear of the vehicle, the temporal and/or geospatial movement of the vehicle, accelerometer data, driver controls, vehicle functional status, vehicle operational status. In other words, at least one of these parameters may be monitored to determine the first and second driving behaviours of the first and second vehicles. In one example the parameters may be the same, for example rate of change of steering wheel angle may be monitored for both vehicles and it may be determined form this parameter that both vehicles are swerving (and therefore may be swerving to avoid a potential cause of accident). In another example the parameters may be different, for example the rate of change of steering wheel angle of the first vehicle may be monitored and the brake pedal pressure of the second vehicle may be monitored. The rate of change of steering wheel angle may indicate that the first vehicle is swerving and the brake pedal pressure may indicate that the second vehicle is braking harshly (and therefore may be indicating that both drivers are behaving to avoid a potential cause of accident). The controller may therefore comprise a vehicle sensor (e.g. a sensor configured to sense a vehicle parameter) of may be configured to receive data from a vehicle sensor.

Therefore, in some examples, to determine whether the driving behaviour of the first vehicle and the driving behaviour of the second vehicle are the same, or similar within the predetermined threshold, the controller may be configured to compute a measure of difference between the first and second performance parameters and to determine that the first and second driving behaviours are the same, or similar within the predetermined threshold, if the measure of difference is zero, or less than a predetermined threshold (e.g. a third threshold). For example, the accelerator pedal rate of change of input of each vehicle may be monitored and determined and a measure of difference of this parameter for each vehicle may be determined. If this measure of difference is less than the predetermined (third) threshold then it may be determined that the driving behaviour is the same. In these examples it may also be determined whether the first and second parameters fall below, or exceed, a predetermined threshold.

In other examples, to determine whether the driving behaviour of the first vehicle and the driving behaviour of the second vehicle are the same, or similar within the predetermined threshold, the controller may be configured to compute a measure of difference between the first performance parameter and a predetermined threshold (e.g. a fourth threshold), and to compute a measure of difference between the second performance parameter and a predetermined threshold (e.g. a fifth threshold), and the determination that the first and second driving behaviours are the same, or similar within the predetermined threshold, is based on each measure of difference. In this example the two performance parameters may be different, and it may be determined that the driving behaviours are the same or similar when the first performance parameter falls below a predetermined acceptable threshold and the second performance parameter exceeds a predetermined acceptable threshold. In another example, the two performance parameters may be different and it may be determined that the driving behaviours are the same or similar when the both performance parameters fall below, or exceed, a predetermined acceptable threshold.

To compute a measure of difference, the controller may be configured to determine the difference between the value of the first and second performance parameters.

According to some examples herein the controller is configured to receive data relating to the flow of traffic and to determine whether the flow of traffic departs from a normal traffic flow. The controller may be configured to receive data describing a normal traffic flow through the given location. The controller may be configured to determine a normal traffic flow through the given location. The controller may be configured to receive data (e.g. data relating to a flow of traffic at the given location) from a smart device (e.g. from a smart camera or smartphone).

The controller may be configured to determine a measure of difference between the flow of traffic and the normal flow of traffic and the controller is to determine that the flow of traffic departs from the normal flow of traffic when the measure of difference is above a predetermined threshold (e.g. a sixth predetermined threshold). In this way, a departure from the normal traffic flow is determined when the (current) flow of traffic is sufficiently different from a normal traffic flow. The normal traffic flow may represent an average traffic flow, e.g. over an historical time interval.

The data relating to the flow of traffic at the given location comprises a virtual representation of the given location, the virtual representation comprising a plurality of virtual traffic paths, each virtual traffic path representing the historical movement of a vehicle through the given location. The normal traffic flow may comprise an average flow path, e.g. over a historical time interval. The controller may be configured to average at least a portion of the plurality of virtual traffic flow paths to determine a normal traffic flow through the given location being the average of the virtual traffic flow paths. In this way, the traffic flow may be visualised as a road network comprising a number of paths in a virtual location, with each path representing the real-time flow of traffic through the given location corresponding to the virtual location.

The virtual representation may comprise a 2-dimensional grid and wherein the virtual traffic paths are lines on the 2-dimensional grid. In this way, the virtual representation may comprise a 2-d visualisation of traffic flow through the given location, e.g. represented in terms of a top, plan, or birds-eye view looking down on the given location, with each flow path being represented by a curve in 2-d space. In other examples, the virtual representation may comprise a 3-dimensional grid, or volume. This may be suited for examples where the vehicle comprises a marine vessel, or an aircraft, etc. In these examples, the virtual representation may comprise a 3-d visualisation of traffic flow through a 3-dimensional volume (corresponding to the given location). In some examples, the 3-d visualisation may be viewable in a virtual environment (e.g. via a virtual reality headset). Accordingly, the controller may be configured to receive the traffic flow data form at least one remotely mounted smart camera. For example, a remotely mounted smart camera may use image recognition software and/or machine learning to identify and classify objects (e.g. pedestrian, car, cycle, van, etc.) and may construct, e.g. through image analysis, the virtual representation being a reconstruction of the area of road space at the given location comprising the temporal and geospatial movement and behaviour of certain objects (e.g. car, pedestrian, etc.) through the area of road space. This data may be sent to the controller and the controller may be configured to determine normal traffic flow. Alternatively, the smart camera may determine a normal traffic flow and send this data to the controller.

The data relating to a geography at the given location may comprise data describing an obstacle within a predetermined distance of the given location. For example, the predetermined distance may comprise a predetermined radius from the given location (e.g. a centre thereof). The data may therefore describe an obstacle (for example, a plurality of obstacles) that are within a predetermined radius of the given location (e.g. a centre thereof). The obstacle may comprise at least one of: a parked vehicle, roadworks, a sign, a tree, a building, a kerb, a road marking, a road gradient, a sight line, a position of the sun, lighting on the road, dustbin, bollard, lamppost, or bush etc.

The controller may be configured to determine that the geography at the given location increases the risk of accident if there is an obstacle within the predetermined distance (or radius) of the given location. For example, if it is determined that a street sign and/or tree is within the predetermined distance, which may be configured so as to be proximate the first and/or second vehicles, then it may be determined that the street sign and/or tree may pose a risk of accident. The controller may be configured to receive data (e.g. data relating to a flow of traffic at the given location from a smart device (e.g. from a smart camera or smartphone).

Issuing the alert may comprise causing an alarm to sound. In other words, if the controller determines that the driving behaviour of the first vehicle and the driving behaviour of the second vehicle are within the predetermined first threshold and the controller determines that the flow of traffic at the given location departs from a normal traffic flow and/or the geography at the given location increases the risk of accident, then the controller is configured to cause an alarm to sound.

The alarm may comprise an audio alarm, visual alarm and/or sending signal to another entity. For example, the alarm may comprise a warning sound, warning light (e.g. on a dash panel of the vehicle) or sending a signal to another vehicle, e.g. that causes an alarm of that other vehicle to sound.

The alert may comprise metadata describing the deviation from the normal traffic flow and/or how the geography increases the risk of accident (e.g. whether an obstacle is present, the type and/or position of an obstacle etc.).

The controller may be configured to issue the alert to all vehicles within a predetermined threshold (e.g. a seventh threshold, e.g. a predetermined radius) of the given location and/or all vehicles travelling towards the given location. The alert issued to another vehicle may comprise instructions that, when executed by the other vehicle, cause an alarm to sound in the third vehicle. As above, the alarm may comprise an audio and/or a visual alarm (e.g. a warning sound or light).

The controller may be configured to issue an alert to a third vehicle, and the alert may comprise machine-readable instructions that, when executed by the third vehicle (e.g. a controller and/or processor thereof) cause the third vehicle to drive away from the given location under autonomous control and/or mimic the driving behaviour of at least one of the first and second vehicle. In another example, the controller may be configured to issue an alert to a third vehicle, and the alert may comprise machine-readable instructions that, when executed by the third vehicle (e.g. a controller and/or processor thereof) cause the third vehicle to deviate from the driving behaviour of at least one of the first and second vehicles. In this latter example, the first and second vehicles may be swerving, but the third vehicle (which may comprise a police vehicle) may deviate from this behaviour by stopping (e.g. to divert traffic).

The controller may be configured to issue an alert to a vehicle route guidance system, and the alert may comprise machine-readable instructions that, when executed by the route guidance system, cause the route guidance system to recalculate a route to a target destination that avoids the given location.

According to one example, there may be provided a vehicle comprising the controller as described above. In this example, the controller is provided on a vehicle and is capable of issuing an alert (or warning) to the driver of the vehicle and/or to a location remote from the vehicle (such as a local authority). In other examples, the controller may be provided remote from a vehicle, for example may be provided proximate an area of road. The vehicle (comprising the controller) may be the first vehicle and/or the second vehicle. In these examples, the controller may be configured to monitor the performance parameter of the vehicle at, on, or in which it is disposed and one other vehicle.

According to another example there is provided a method comprising receiving data relating to a first performance parameter of a first vehicle at a given location to determine a driving behaviour of the first vehicle, and receiving data relating to a second performance parameter of a second vehicle at the given location to determine a driving behaviour of the second vehicle, receiving data relating to at least one of: a flow of traffic at the given location; and a geography at the given location, determining whether the driving behaviour of the first vehicle and the driving behaviour of the second vehicle are the same, or similar within a predetermined first threshold and determining at least one of: whether the flow of traffic at the given location departs from a normal traffic flow; and whether the geography at the given location increases the risk of accident, and if it is determined that the driving behaviour of the first vehicle and the driving behaviour of the second vehicle are the same, or similar within a predetermined first threshold, and if it is determined that at least one of: the flow of traffic at the given location departs from a normal traffic flow; and the geography at the given location increases the risk of accident, issuing an alert.

The method may comprise receiving data relating to accidents that have occurred within a predetermined threshold of the given location (e.g. a predetermined second threshold). The method may comprise determining whether an accident has occurred within the predetermined threshold.

The alert may be issued based on whether an accident has occurred within the predetermined threshold. If it is determined that an accident has not occurred within the predetermined threshold then the method may comprise issuing the alert. If it is determined that an accident has occurred within the predetermined threshold then the method may comprise issuing the alert. The alert may comprise metadata describing the accident that has occurred within the predetermined threshold.

At least one, or both, of the first and second performance parameters may comprise at least one of: brake pedal pressure, speed, engine speed, the steering wheel angle, rate of change of input to the accelerator pedal, rate of change of position of the accelerator pedal, rate of change of steering wheel angle, the gear of the vehicle, the temporal and/or geospatial movement of the vehicle, accelerometer data, driver controls, vehicle functional status, vehicle operational status.

Determining whether the driving behaviour of the first vehicle and the driving behaviour of the second vehicle are the same, or similar within the predetermined threshold, may comprise computing a measure of difference between the first and second performance parameters, and determining that the first and second driving behaviours are the same, or similar within the predetermined threshold, may comprise determining that the measure of difference is zero, or less than a predetermined threshold (e.g. a predetermined third threshold).

Determining whether the driving behaviour of the first vehicle and the driving behaviour of the second vehicle are the same, or similar within the predetermined threshold, may comprise computing a measure of difference between the first performance parameter and a predetermined threshold (e.g. a fourth threshold), and computing a measure of difference between the second performance parameter and a predetermined threshold (e.g. a fifth threshold), and determining that the first and second driving behaviours are the same, or similar within the predetermined threshold, may be based on each measure of difference.

Computing the measure of difference may comprise determining the difference between the value of the first and second performance parameters.

The method may comprise receiving data describing a normal traffic flow through the given location. The method may comprise determining a normal traffic flow through the given location. The method may comprise determining a measure of difference between the flow of traffic and the normal flow of traffic, and determine that the flow of traffic departs from the normal flow of traffic when the measure of difference is above a predetermined threshold (e.g. a predetermined sixth threshold).

The data relating to the flow of traffic at the given location may comprise a virtual representation of the given location, the virtual representation comprising a plurality of virtual traffic paths, each virtual traffic path representing the historical movement of a vehicle through the given location. The virtual representation may comprise a 2-dimensional grid and wherein the virtual traffic paths are lines on the 2-dimensional grid.

The method may comprise averaging at least a portion of the plurality of virtual traffic flow paths to determine a normal traffic flow through the given location being the average of the virtual traffic flow paths.

The data relating to a geography at the given location may comprise data describing an obstacle within a predetermined distance of the given location.

The method may comprise determining that the geography at the given location increases the risk of accident if there is an obstacle within the predetermined distance of the given location.

The obstacle may comprise at least one of: a parked vehicle, roadworks, a sign, a tree, a building, a kerb, a road marking, a road gradient, a sight line, a position of the sun, lighting on the road, dustbin, bollard, lamppost, or bush etc.

Receiving data (e.g. data relating to a flow of traffic at the given location and/or a geography at the given location) may comprise receiving data from a smart device (e.g. from a smart camera or smartphone).

Issuing the alert may comprise issuing the alert to at least one of: a local authority, a fleet manager (e.g. of the first and/or second vehicle), a driver of a vehicle (e.g. the first and/or second vehicle). Issuing the alert may comprise causing an alarm to sound.

The alert may comprise metadata describing the deviation from the normal traffic flow and/or how the geography increases the risk of accident (e.g. whether an obstacle is present, the type and/or position of an obstacle etc.).

Issuing the alert may comprise issuing the alert to all vehicles within a predetermined threshold (e.g. a seventh predetermined threshold, e.g. a predetermined radius) of the given location and/or all vehicles travelling towards the given location.

Issuing the alert may comprise issuing an alert to a third vehicle, and wherein the alert comprises machine-readable instructions that, when executed by the third vehicle (e.g. a controller and/or processor thereof) cause the third vehicle to drive away from the given location under autonomous control and/or mimic (or, in other examples, deviate) the driving behaviour of at least one of the first and second vehicle.

Issuing the alert may comprise issuing the alert to a vehicle route guidance system, and wherein the alert comprises machine-readable instructions that, when executed by the route guidance system, cause the route guidance system to recalculate a route to a target destination that avoids the given location.

According to another example there is provided a non-transitory machine-readable medium comprising instructions which, when executed by a processor, cause the processor to perform the method as described above.

Accordingly, some examples herein relate to correlating accident data, vehicle behavioural data, traffic data, and geographical data to assess the risk of accident at a given location based on observable, measurable, behaviours (e.g. of drivers) which can be used to design an intervention strategy to lower the risk of accident at any location determined to be at risk of accident. These examples can also be used to monitor the intervention strategy to see whether they are working to actively lower the risk of accident. Some examples use a combination of vehicle data and traffic flow data or vehicle data and geographical data. Some examples use a combination of vehicle data, traffic flow data, and geographical data. In some examples accident data is also used. Using the correlation between these parameters allows other locations to be identified as potentially high risk when a similar correlation is determined at another location with similar correlations to the location already identified as potentially high risk. In other words, other locations with equal or similar driver behaviours, and/or other parameters may be flagged as potentially high risk, for example may be flagged as areas of "near miss" activity and/or at risk of a future accident.

BRIEF DESCRIPTION OF THE DRAWINGS

For a better understanding of the present disclosure, and to illustrate how it may be put into effect, examples will now be described with reference to the accompanying drawings in which:

FIG. 10b is a schematic diagram of an average traffic flow through the road layout of FIG. 10a based on the traffic flow shown in FIG. 10a;
FIGS. 10c-10e are example traffic flows through the example road layout of FIG. 10a that show a different flow path than the average flow path shown in FIG. 10a.

DETAILED DESCRIPTION

The present disclosure relates to a controller for a vehicle, such as a motor vehicle (e.g. car, van, truck, motorcycle etc.), industrial or agricultural vehicles (e.g. tractor, forklift, bulldozer, excavator etc), marine vessel, aircraft or any other type of vehicle.

Figure 1:
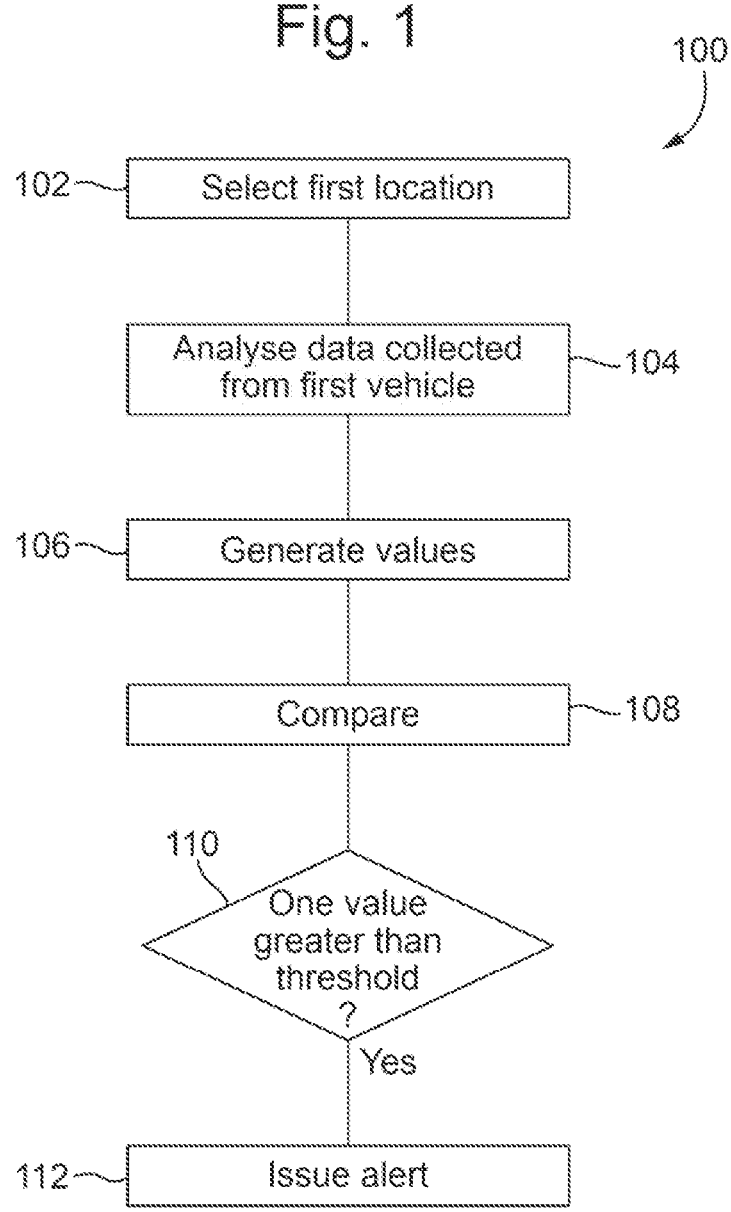
FIG. 1 is a flowchart of an example method.

FIG. 1 shows an example method 100. The method 100 may be a method for assessing the road safety risk at a given location. The method 100 may be a method of determining a risk factor at a given location. More generally, the method 100 may be a method of determining road safety.

At block 102, the method 100 comprises selecting a first location from a set of locations. Block 102, in some examples, may comprise a user manually selecting a location, for example a location in a city selected from a city map or user directory. In other examples, block 102 may be performed automatically, e.g. by a processor, a location from the set of locations based on at least one criteria to be explained with reference to another example below.

At block 104, the method 100 comprises analysing, by a processor, data collected from a first vehicle located within a first distance of the first location. The data may, in some examples, be streamed from the vehicle. In one example, the vehicle may transmit data to a remote storage device, such as a cloud device, and the stored data may be received by a device comprising the processor for analysis. In other examples, a device on or in the vehicle itself, such as a plug-in device, may transmit data to another location, such as a server device (e.g. via a cellular network). In one example, a "plug-in device" on the vehicle or embedded modem may constantly monitor a controller area network (CAN) device of the vehicle to collect the required data from the CAN device (such as a bus) and transmit at least a part of the data to another location for analysis, e.g. via a cellular network.

At block 106, the method 100 comprises generating values representative of respective performance parameters of the first vehicle. For example, block 106 may comprise generating a first value representative of a first performance parameter of the first vehicle and generating a second value representative of a second performance value of the first vehicle. The performance parameters may be at least one of: the brake pedal pressure of the first vehicle, the speed of the first vehicle, the speed of the first vehicle engine, the steering wheel angle of the first vehicle, the rate of change of steering wheel angle of the first vehicle, the accelerator pressure of the first vehicle, the state of at least one indicator of the first vehicle, the gear of the first vehicle, and the first vehicle type.

Therefore, block 106 may comprise generating values representative of the behaviour of the vehicle, for example how the vehicle is being operated. As will explained below, in subsequent steps, these may be assessed to determine if the vehicle is being operated "at-risk" and therefore may be used to determine a risk of accident at the first location.

At block 108, the method 100 comprises comparing at least one value with a first threshold; and at block 110, it is determined whether this value is greater than (in some example, less than) the first threshold. If it is determined at block 110 that the first value is greater than or less than the first threshold then the method 100 proceeds to block 112 at which an alert is issued, e.g. a safety alert.

For example, at block 106 the method 100 may comprise generating a value representative of the brake pedal pressure of the first vehicle. At block 108 this value may be compared with a threshold brake pedal pressure which may indicate a minimum brake pedal pressure which should be applied for the vehicle to be considered to be operated safely. Accordingly, at block 110 if it is determined that the brake pedal pressure value is less than the threshold an alert may be issued at block 112 which may indicate that the vehicle is being operated at risk (e.g. to other vehicles or pedestrians) or that there is a heightened risk of accident. For example, the first location may represent a roundabout or a corner or T-intersection and so a minimal amount of brake pressure may be expected to be applied by a user of the vehicle so as to decelerate the vehicle to a speed appropriate for entering the roundabout or for taking corners, etc. Accordingly, the applied brake pedal pressure being below the minimum threshold (as determined at block 110) at the first location may cause the alert to be issued at block 112 as this may, in this example, indicate that the vehicle is heading toward the first location too fast.

Alternatively, the brake pedal threshold may be a maximum threshold as higher braking pressure than expected may suggest that the driver is emergency braking, and this may cause the alert to be issued at block 112.

By way of another example, at block 106 the method 100 may comprise generating a value representative of the gear of the first vehicle. At block 108 this value may be compared to a threshold gear number which may indicate a minimum gear, or a maximum gear, at which the vehicle would be considered to be operated safely. For example, if the first location were on, and in the middle of, a freeway then the threshold gear may be fourth of fifth, indicating a minimum range of speeds that are considered safe. If the vehicle's gear were below this threshold then this may indicate that the vehicle is being operated at too low a gear (and therefore too slowly) for its location (the first location being on a freeway where the speed limit may be comparatively high). Alternatively, the first location could be at, or near, a school zone and the threshold gear may be, for example, third gear, and if the operated gear is above this threshold then this may indicate that the vehicle's speed is too fast for the school zone. In each of these examples, an alert may be issued to alert someone (for example, the driver or a remote party) of the risk.

By way of a further example, if the value is representative of the vehicle speed then the threshold may be a maximum threshold (such as the local speed limit at the first location). When the vehicle speed value is above this threshold then it is determined that the vehicle is being operated above the local speed limit and hence the alert is issued at block 112.

Hence, the method 100, at block 110, comprises comparing the value to a threshold and issuing an alert when the value is greater (in some examples) or less (in other examples) than the threshold since whether there is a risk may depend on the type of parameter being monitored.

As will now be explained with reference to FIG. 2, multiple values may be used, and the alert may be issued when a combination of values is above, or below, the threshold.

Figure 2:
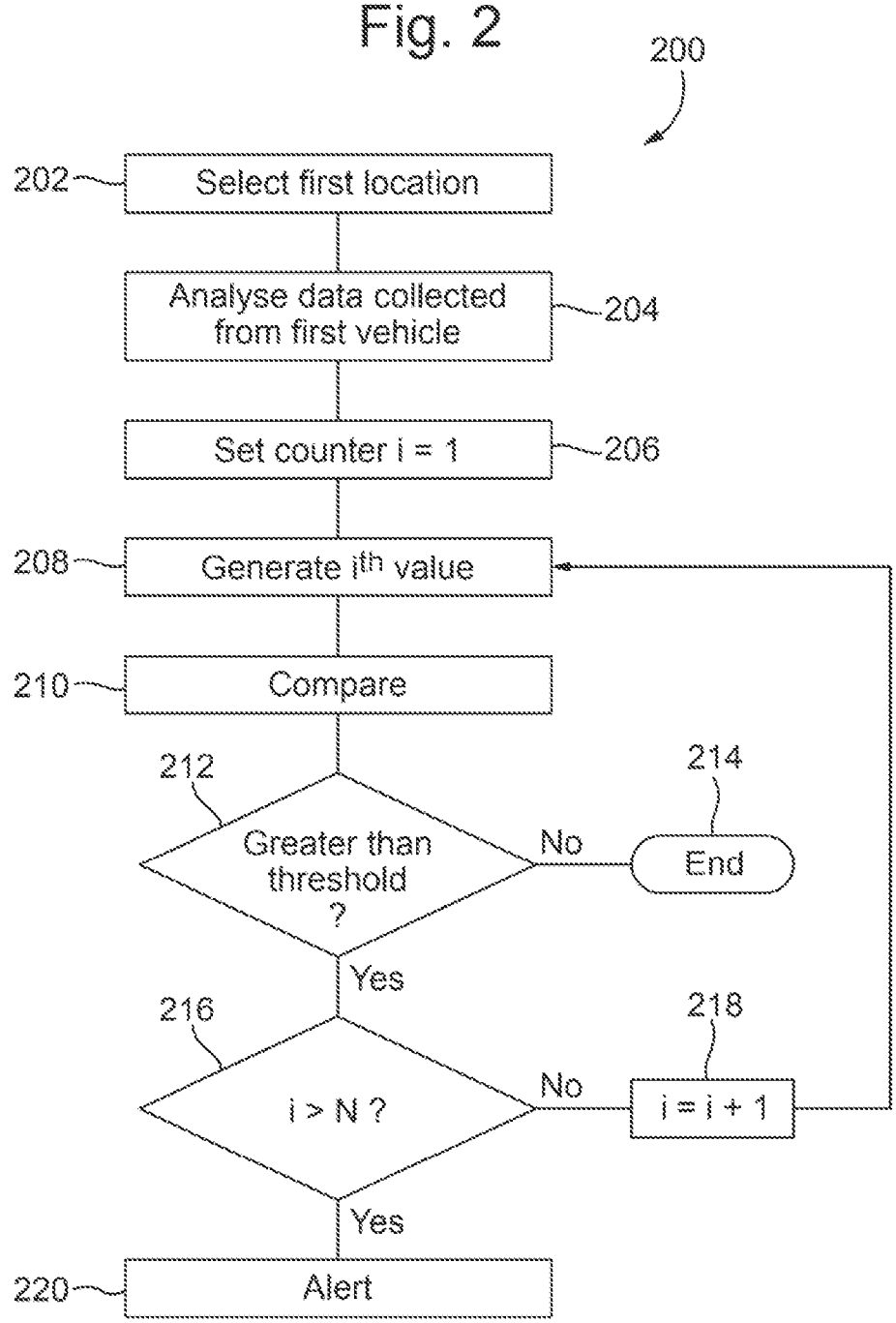
FIG. 2 is a flowchart of an example method.

FIG. 2 shows a method 200 in which comprises generating a plurality of values, each value of the plurality being representative of a parameter of the first vehicle, and wherein the first value is one of the plurality, then comparing each one of the plurality of values to a respective threshold value. As for the example of FIG. 1, depending on whether each one of the values is greater than (in some examples, less than) its respective threshold, an alert may be issued.

The method 200 of FIG. 2 may be a method for assessing the road safety risk at a given location. The method 200 may be a method of determining a risk factor at a given location. More generally, the method 200 may be a method of determining road safety.

At block 202 the method 200 comprises selecting a location from a set of locations. As for the method 100, block 202, in some examples, may comprise a user manually selecting a location, for example a location in a city selected from a city map or user directory. In other examples, block 202 may be performed automatically, e.g. by a processor, a location from the set of locations based on at least one criteria to be explained with reference to another example below.

At block 204, the method 200 comprises analysing, by a processor, data collected from a first vehicle located within a first distance of the first location. The data may, in some examples, be streamed from the vehicle. In one example, the vehicle may transmit data to a remote storage device, such as a cloud device, and the stored data may be received by a device comprising the processor for analysis. In other examples, a device on or in the vehicle itself, such as a plug-in device, may transmit data to another location, such as a server device (e.g. via a cellular network). In one example, a "plug-in device" on the vehicle or embedded modem may constantly monitor a controller area network (CAN) device of the vehicle to collect the required data from the CAN device (such as a bus) and transmit at least a part of the data to another location for analysis, e.g. via a cellular network.

At block 206 the method 200 setting a counter i=1. In this example, N values are to be generated and so the counter i will count from 1 to N. In this example, N values are to be generated with each one of the N values representing a parameter (in one example, a different parameter) of the first vehicle. The parameter(s) may be at least one of: the brake pedal pressure of the first vehicle, the speed of the first vehicle, the speed of the first vehicle engine, the steering wheel angle of the first vehicle, the accelerator pressure of the first vehicle, the state of at least one indicator of the first vehicle, the gear of the first vehicle, and the first vehicle type.

At block 208, the method 200 comprises generating a first (the ith) value, this value being representative of a first (ith) parameter of the first vehicle. At block 210 this value is compared with a threshold Ti, and at block 212 the method comprises determining whether the ith value is greater than, or less than, its respective threshold Ti. If not, the method 200 advances to block 214 where it ends. As will be appreciated, whether the ith value is greater than or less than its respective threshold may depend on at least one of the first location and the type of value that is being measured (e.g. gear or engine speed, etc.).

If, at block 212 it is determined that the ith generated value is greater than, or less than, its respective threshold then the method advances to block 216 at which it is determined whether the counter i has reached N. If the counter i has not reached N then the method proceeds to block 218 in which the counter is incremented by 1 and the method returns back to block 216, and the next value is generated (e.g. a value corresponding to the next parameter). The method 200 then comprises performing blocks 210 and 212 for the subsequent value.

Having generated the required number of values, and if all of those values were determined (at block 212) to be greater than, or less than, their respective thresholds, then the method 200, at block 220 comprises issuing an alert. Therefore, the example of FIG. 2 comprises generating a plurality of values, each representing a parameter, and comparing these values to individual thresholds. An alert is issued if each value is determined to be too low, or too high, relative to their respective threshold. Thus, the example of FIG. 2 may be used in example situations where an individual measured performance parameter is not enough to make a risk assessment, which is instead one on the basis of two or more parameters. For example, a vehicle being operated at too high a gear (e.g. the determined gear is assessed to be above a maximum gear threshold) may not on its own be enough for one example method to determine that there is a risk, but in combination with, for example, accelerator pedal pressure being above a maximum threshold pressure may indicate that the vehicle is being operated at a high speed with no signs of the driver slowing, and in this example an alert may be issued to alert the driver of the vehicle (or a remote source) of a risk of accident.

Figure 3:
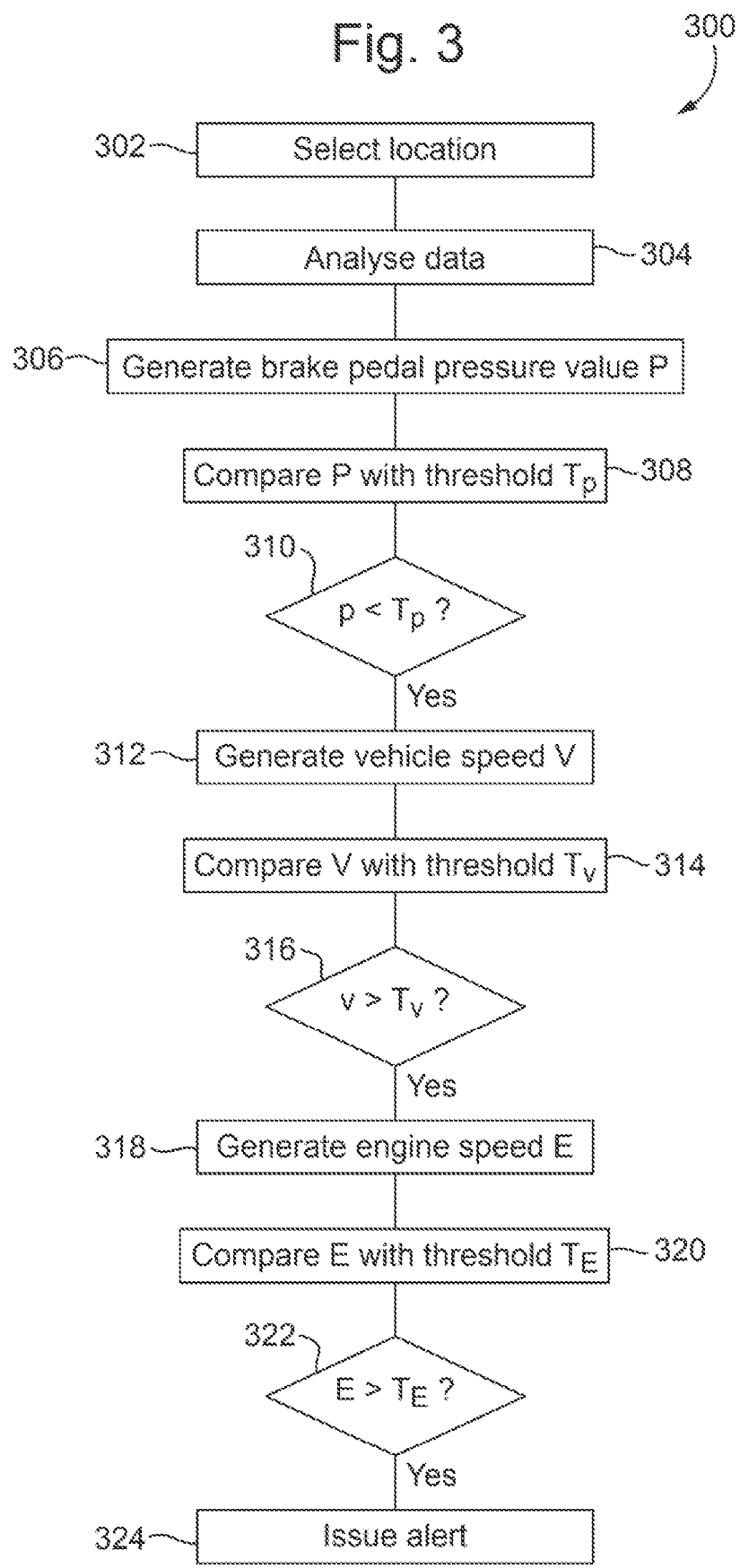
FIG. 3 is a flowchart of an example method.

Once example of FIG. 2 (where N=3, and where each value represents a specific and different parameter) is depicted in FIG. 3 and will now be described.

FIG. 3 shows an example method 300, which may be an example of the method 200 of FIG. 2. At block 302 the method 300 comprises selecting a location from a set of locations. At block 304, the method 300 comprises analysing, by a processor, data collected from a first vehicle located within a first distance of the first location.

At block 306 the method comprises generating a brake pedal pressure value and at block 308 the method comprises comparing this generated value to a brake pedal pressure threshold. At block 310 it is determined whether the generated brake pedal pressure value is lower than a brake pedal pressure threshold and if it is the method proceeds to block 312 at which a vehicle speed value is generated. At block 314 the generated vehicle speed value is compared to a vehicle speed threshold and, if at block 316 it is determined that this value exceeds the vehicle speed threshold then at block 318 an engine speed value is generated and, at block 320, is compared to an engine speed threshold. If the engine speed value is greater than the threshold (determined at block 322) then at block 324 an alert is issued. The vehicle speed threshold may, for example, be the local speed limit. Therefore, in the example of FIG. 3 an accident probability, or risk, is determined when the vehicle is being operated at too low a break pressure, with too high a vehicle and engine speed. This may represent the vehicle being operated too fast (e.g. for the first location) with no signs of slowing. An alert may not be issued if, for example, the brake pedal pressure is over a minimum brake pedal pressure threshold as this example may represent the driver attempting to slow the vehicle even though its speed may exceed the local speed limit.

Alternatively, the brake pedal pressure threshold may be a maximum threshold and, at block 310, it may be determined that the brake pedal pressure value is above the threshold and, if it is, the method 300 may proceed to block 312.

It will be appreciated that the order in which these steps are depicted in, and described with reference to, FIG. 3 is for illustrative purposes only.

Figure 4:
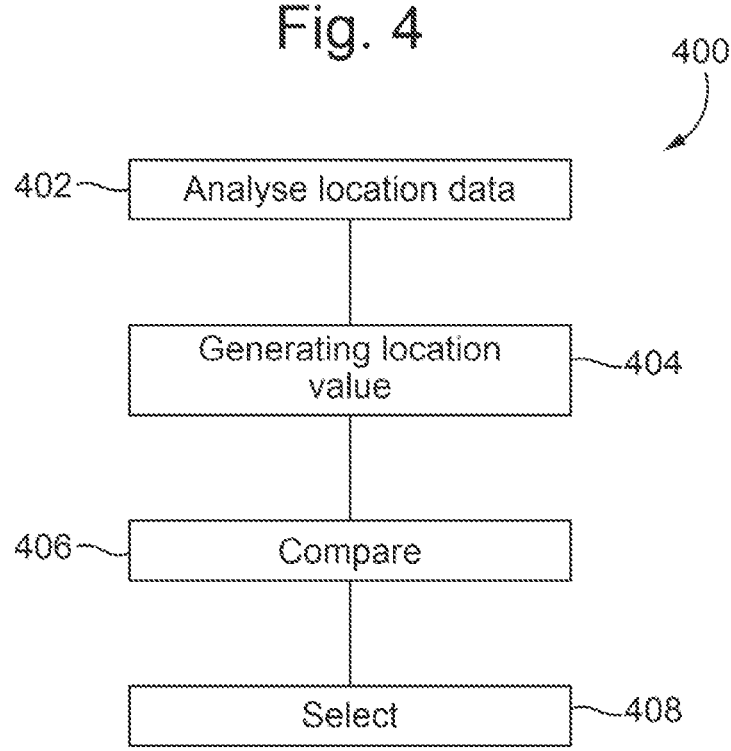
FIG. 4 is a flowchart of an example method.

FIG. 4 shows an example method 400 for selecting a first location from a set of locations. The method 400 of FIG. 4 may be utilised in any of blocks 102, 202, or 302 of the example methods of FIGS. 1, 2, and 3, respectively. Alternatively, the method may be a stand-alone method and may not be used in conjunction with any of the methods of the examples of FIG. 1, 2, or 3.

The method 400 comprises, at block 402, analysing, by a processor, location data collected from a monitoring service of a computing system, the location data comprising a set of location data points. In one example, the location data comprises a set of location data points within a distance (e.g. a radius) of a vehicle (e.g. the first vehicle).

At block 404, the method 400 comprises generating, for each location data point in the location data, a location value representative of a first location parameter of the location data. The first location parameter may be any of, e.g. at least one of, the number of traffic accidents that have occurred at each location data point, the average severity of the traffic accidents that have occurred at that location data point, the traffic data at that location data point, the weather at that location data point, the time of day, the road surface at that location data point.

At block 406, the method 400 comprises comparing each location value with a first location threshold to determine the set of location data points that have a location value greater than, or less than, the first location threshold.

At block 408, the method 400 comprises selecting one of the location data points that has a location value greater than, or less than, the first location threshold as the first location.

For example, if the location value generated at block 404 is representative of the number of traffic accidents, then at block 406 this may be compared to a maximum number of traffic accidents, and if it is determined that the value is over this maximum threshold then it may be determined that this location is dangerous, or at risk of accident, and so it may be selected as the first location.

In one example, block 404 may comprise generating a plurality of location values, and at block 406 each one of the plurality of location values may be compared to a respective threshold. For example, block 404 may comprise a value representing the traffic data, and the weather at a given location. If the traffic data, when compared to a traffic data threshold, is above a maximum threshold indicating the presence of heavy traffic and if the weather data is above a weather data threshold indicating bad weather (e.g. heavy rain and/or wind) then this location may be selected as the first location, as this may indicate that this location is susceptible to traffic accidents, due to the traffic and weather thresholds being exceeded.

Figure 5:
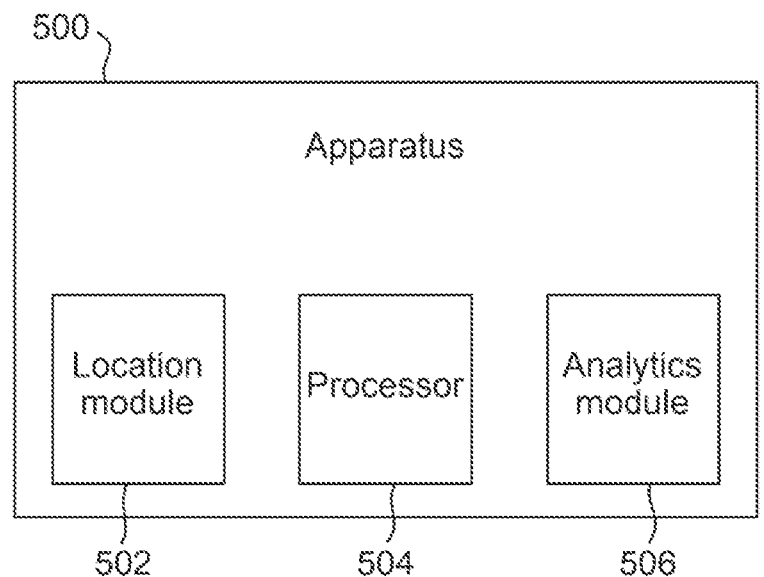
FIG. 5 is an example processing apparatus.

FIG. 5 shows a processing apparatus 500. The processing apparatus 500 comprises a location module 502 configured to select a first location from a set of locations, and a processor 504 configured to analyse data collected from a first vehicle located within a first distance of the first location, and an analytics module 506 configured to generate a first value representative of a first parameter of the first vehicle, and configured to comparing the first value with a first threshold; and configured to issue an alert depending on whether the first value is greater than (in some examples, less than) the first threshold.

The processing apparatus 500 may be configured to perform the method according to any one of the examples of FIGS. 1-4.

Figure 6:
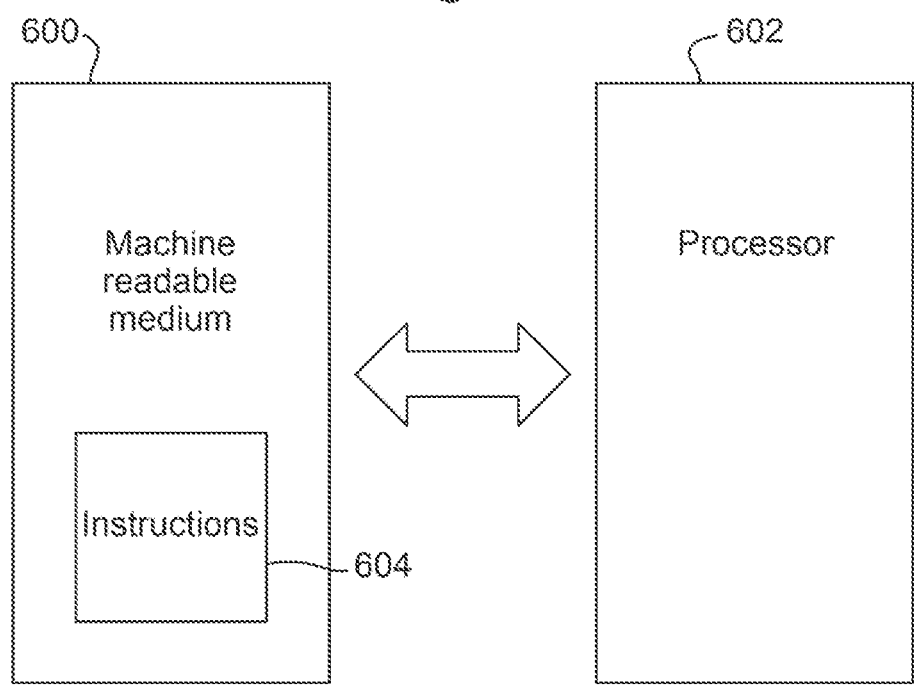
FIG. 6 is an example of a machine readable medium in association with a processor.

FIG. 6 is an example of a tangible (and non-transitory) machine readable medium 600 in association with a processor 602. The tangible machine readable medium 600 comprises instructions 604 which, when executed by the processor 602, cause the processor 602 to carry out a plurality of tasks. For examples, the instructions 604 may comprise instructions to cause the processor 602 to perform the method according to any one of the examples of FIGS. 1-4.

Figure 7:
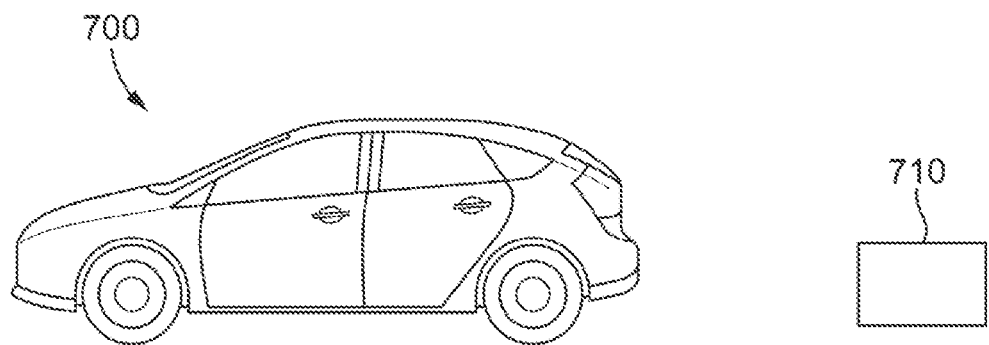
FIG. 7 is a schematic diagram of an example controller.

FIG. 7 shows a vehicle 700 and a controller 710 for the vehicle 700. The controller 710 is configured to receive data relating to a first performance parameter of a first vehicle (not shown) at a given location to determine a driving behaviour of the first vehicle, and to receive data relating to a second performance parameter of a second vehicle (not shown) at the given location to determine a driving behaviour of the second vehicle. The controller is further configured to receive data relating to a flow of traffic at the given location and/or a geography at the given location, and, if the controller determines that the driving behaviour of the first vehicle and the driving behaviour of the second vehicle are the same, or similar within a predetermined first threshold, and the controller determines that the flow of traffic at the given location departs from a normal traffic flow and/or the geography at the given location increases the risk of accident, then the controller is configured to issue an alert. In the example of FIG. 7 the controller 710 is remote from the vehicle 700 but in other examples the vehicle 700 may comprise the controller 710.

Figure 8:
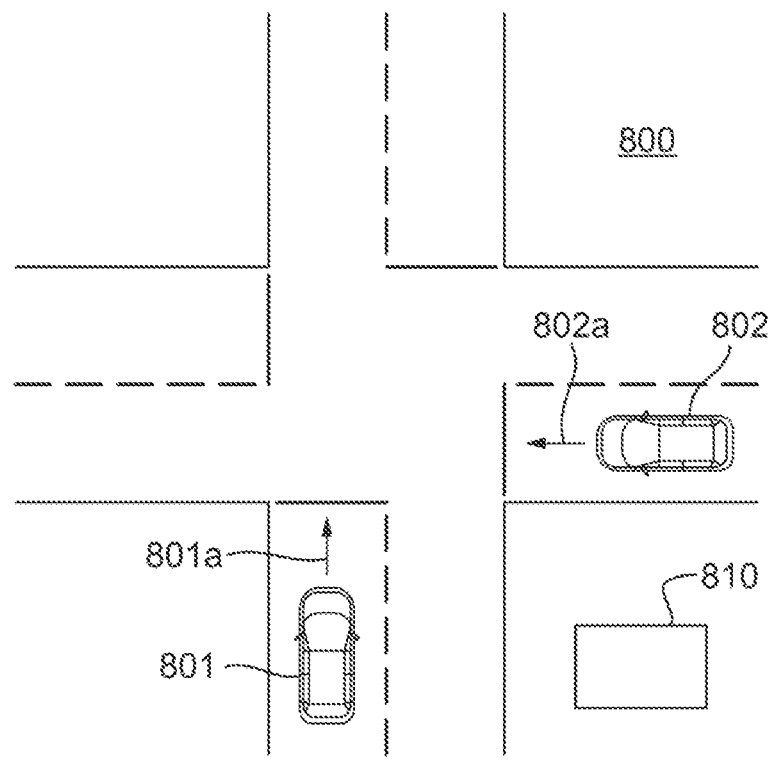
FIG. 8 is a schematic diagram showing an example road layout.

FIG. 8 schematically shows a given location 800. At the given location are a first vehicle 801 and second vehicle 802. The given location 800 in the FIG. 8 example comprises a 4-way crossing, or intersection, but it will be understood that this is for purely exemplary purposes to illustrate some of the principles of this disclosure and that other given locations are within the scope of the examples described herein. FIG. 8 schematically shows a controller 810. The controller 810 is for a vehicle which may be the first vehicle 801, the second vehicle 802 or a (not shown) other vehicle. The controller 810 may comprise the controller 710 as described with reference to FIG. 7.

Accordingly, the controller 810 is configured to receive data relating to a first performance parameter of the first vehicle 801 to determine a driving behaviour of the first vehicle 801, and to receive data relating to a second performance parameter of a second vehicle 802 at to determine a driving behaviour of the second vehicle 802. The first vehicle 801 is moving in the direction of travel indicated by arrow 801a and the second vehicle 802 is moving in the direction of travel indicated by arrow 802a. Both vehicles are therefore moving towards the intersection. The performance parameter may comprise at least one of: brake pedal pressure, speed, engine speed, the steering wheel angle, rate of change of input to the accelerator pedal, rate of change of position of the accelerator pedal, rate of change of steering wheel angle, the gear of the vehicle, the temporal and/or geospatial movement of the vehicle, accelerometer data, driver controls, vehicle functional status, vehicle operational status.

These performance parameters may be monitored in order to determine whether the two vehicles 801, 802 are behaving similarly in order to look at further data to determine whether there is a cause of the vehicles behaving similarly (in that their drivers are exhibiting similar driving styles). Accordingly, if the first and second driving behaviours are similar it may be determined that the vehicles are behaving similarly and the controller 810 may look at traffic flow data and/or geographic data to determine whether there may be a cause of the vehicle's behaviour, which may need to be investigated.

Figure 9:
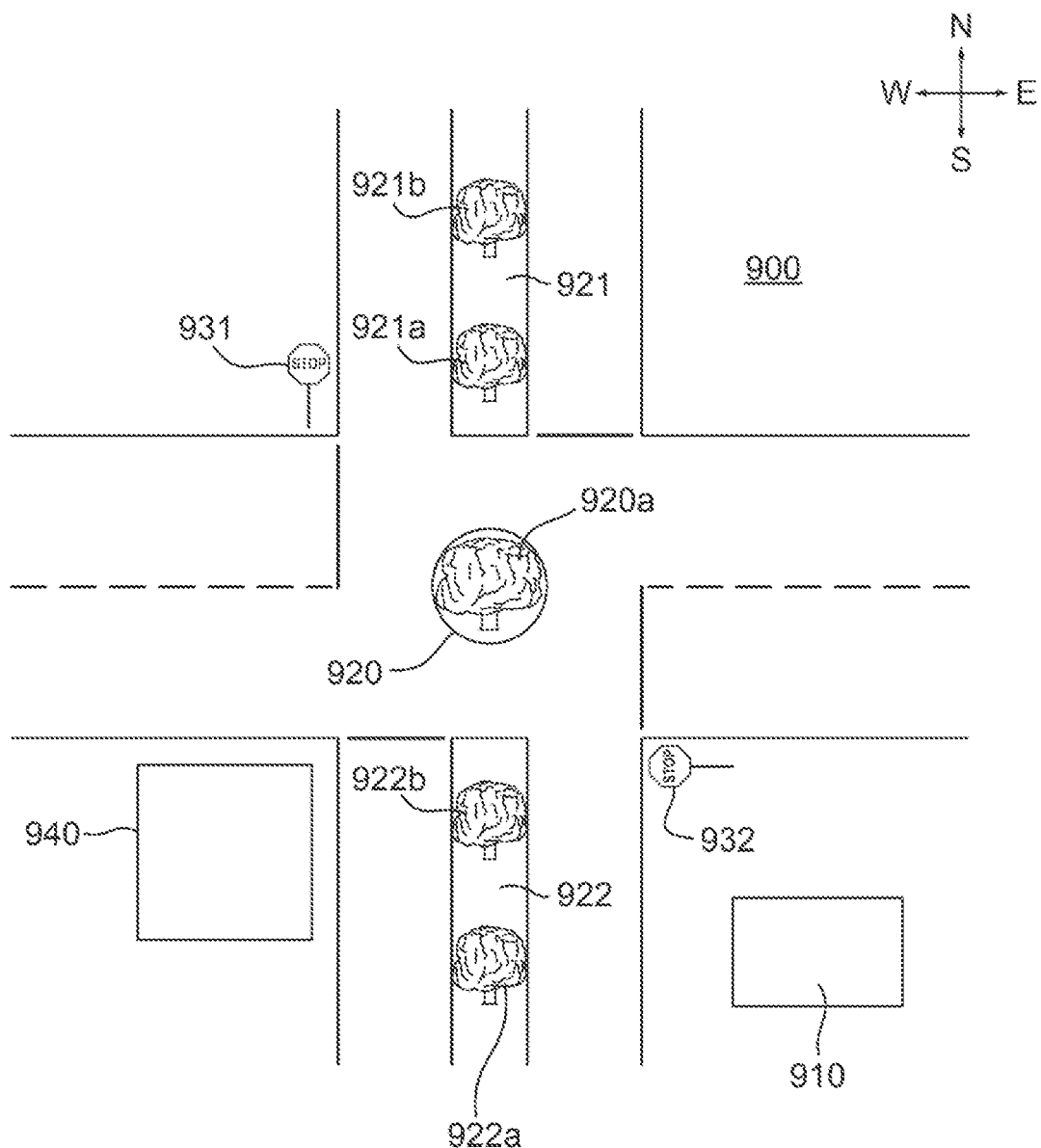
FIG. 9 is a schematic diagram showing an example road layout showing geographical features.

This is schematically shown in FIGS. 9 and 10.

FIG. 9 shows a location 900 which comprises an intersection in which the north-south road is a boulevard, or similar, in that it comprises a nature strip 921, 922 between the lanes of the road. In the middle of the intersection is another nature strip 920 which has a tree 920a and the nature strips 921, 922 between the lanes of the north-south road also comprise trees 921a, 921b, 922a, 922b. The location 900 also comprises two stop signs 931 and 932 which are respectively provided on the corners joining the west-north and south-east roads of the intersection. A building 940 is on the corner of the west-south road of the intersection. For the sake of clarity the first and second vehicles are not shown in FIG. 9.

A controller 910, which may comprise the controllers 710 or 810 of the FIGS. 7 and 8 examples, is configured to receive data relating to first and second performance parameters of the (not shown) first and second vehicles to determine whether their driving behaviour is the same or similar. The controller is also configured to receive data relating to the geography at the location 900. For example, for the location 900 the geographical data received by the controller may include at least one of (and in one example, all of) the position (e.g. spatial arrangement, for example coordinates) of the natures trips 920, 921, 922, trees 920a, 921a, 921b, 922a, 922b, signs 931, 932, and building 940—these may be referred to as "obstacles".

As will be described below, similar driving behaviour of the first and second vehicles may indicate a fault with one of the obstacles and/or that the obstacle needs investigation. For example, similar driving behaviour proximate one of the trees and/or stop signs (e.g. a rate of change of steering wheel angle) may suggest that the drivers of the first and second vehicles are swerving to avoid something, which may indicate that the tree and/or stop sign has fallen and is now blocking or obstructing part of the road. In another example, similar driving behaviour proximate the building 940 may suggest that the drivers (e.g. travelling east on the west road) are veering to the north side of the west road so as to check for oncoming traffic on the south road, which may suggest that the building is posing a sight-line, or visibility, problem.

As explained above, the controller is also configured to receive traffic flow data.

Figure 10A:
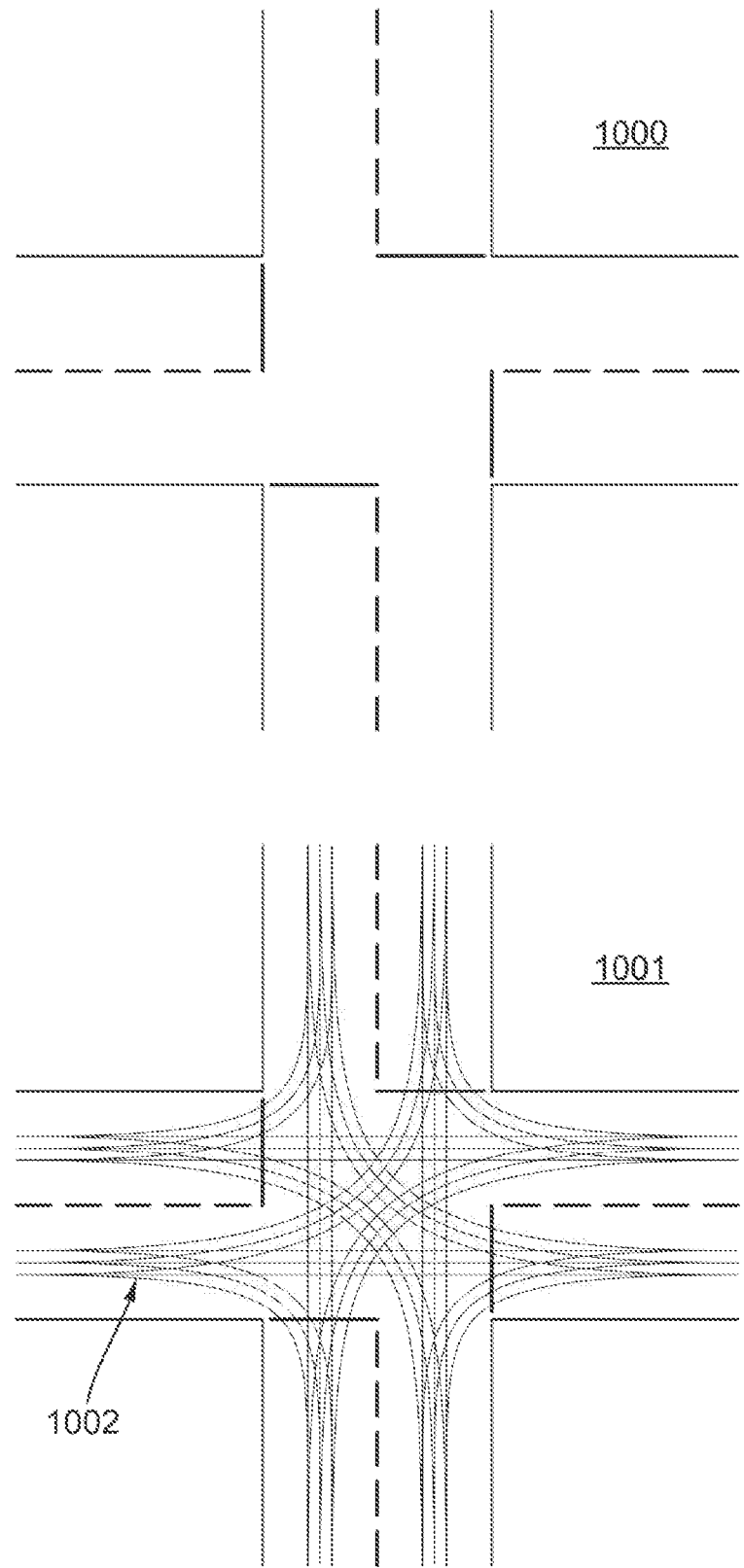
FIG. 10a is a schematic diagram of an example road layout and a representation of flow paths of traffic through the road layout.

FIG. 10a shows a location 1000 which comprises an intersection and which may comprise the location 800 or 900. For simplicity, only a basic road layout is shown in the location 1000 of the FIG. 10a example. It will be appreciated that, over time, there will be movement of vehicles into and through the intersection 1000. This may enable the creation of a visual road-map, or virtual representation of the location 1000 showing the movement of a plurality of vehicles through the location 1000 by way of lines or paths through a virtual location corresponding to the physical location 1000. This is shown in FIG. 10a as the virtual location 1001. The virtual location 1001 is a virtual representation of the real-world location 1000 and comprises a plurality of paths 1002, with each path 1002 representing the real-life movement of a vehicle through the location 1000, the virtual path 1002 corresponding to the path the vehicle took in the real world. In this way a 2-dimensional representation of the location 1000 is produced comprising a number of 2-dimensional lines, or curves, that characterise the traffic flow through the location 1000 during a real-world time interval. The controller (e.g. the controller of FIGS. 7, 8, and/or 9, may be configured to receive the data in the same or similar format as shown in FIG. 10 (e.g. the 2-dimensional representation 1001) or may be configured to receive an average traffic flow.

Figure 10B:
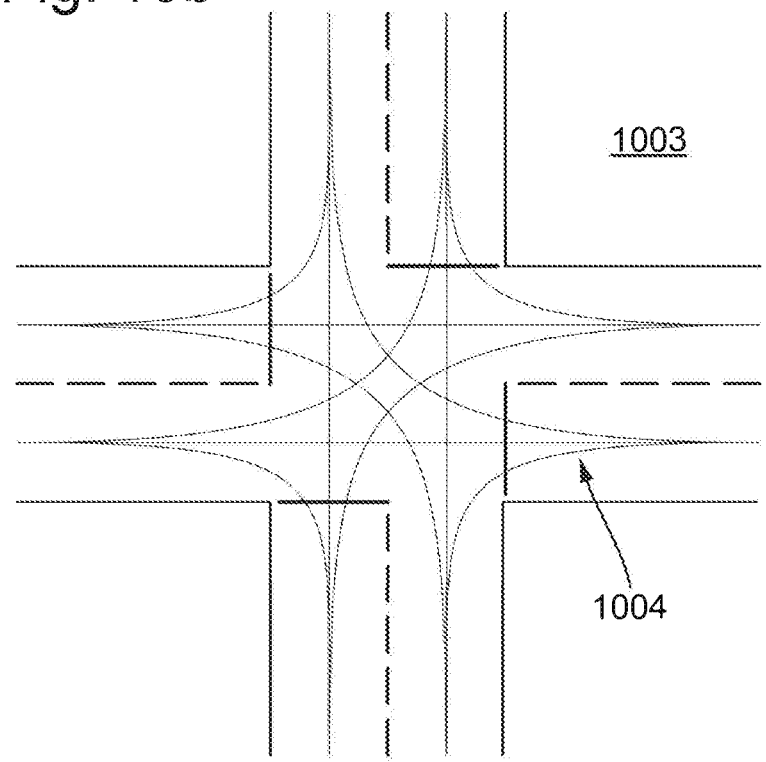

FIG. 10b shows such an average traffic flow representation 1003 which may be transmitted to the controller, or alternatively the controller may be configured to determine the average traffic flow. As FIG. 10b shows, the plurality of traffic flow paths of the representation 1001 have been averaged to produce an average traffic flow as indicated by the lines 1004 and this may be interpreted as a "normal" traffic flow through the location 1000 virtually represented by the representation 1003. As stated above, the controller may be configured to receive data in the same or similar format to 1003, or may receive data in the same or similar format to the representation 1002 and may be configured to determine or produce the normal traffic flow 1003 from the received data. Remotely mounted smart cameras (e.g. mounted at or around the location 1000) may monitor the area to determine the traffic flow and produce the representation 1002 for transmitting to the controller. Alternatively, the controller may be configured to receive data from a remotely mounted smart camera to build the representation 1002. The remotely mounted smart cameras may also be configured to produce the representation 1003 and transmit this to the controller. In another example the remotely mounted smart cameras may transmit data to a remote control unit, the control unit being configured to build the representation 1002 and/or 1003 and transmit this to the controller, the controller thereby being configured to receive the traffic flow data from the control unit.

Figure 10C:
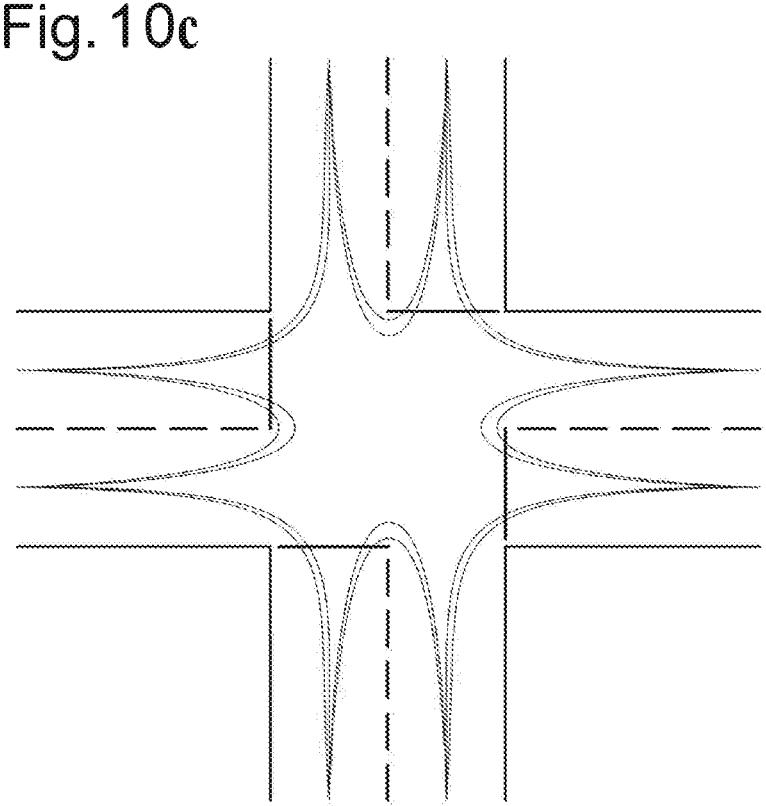
Figure 10D:
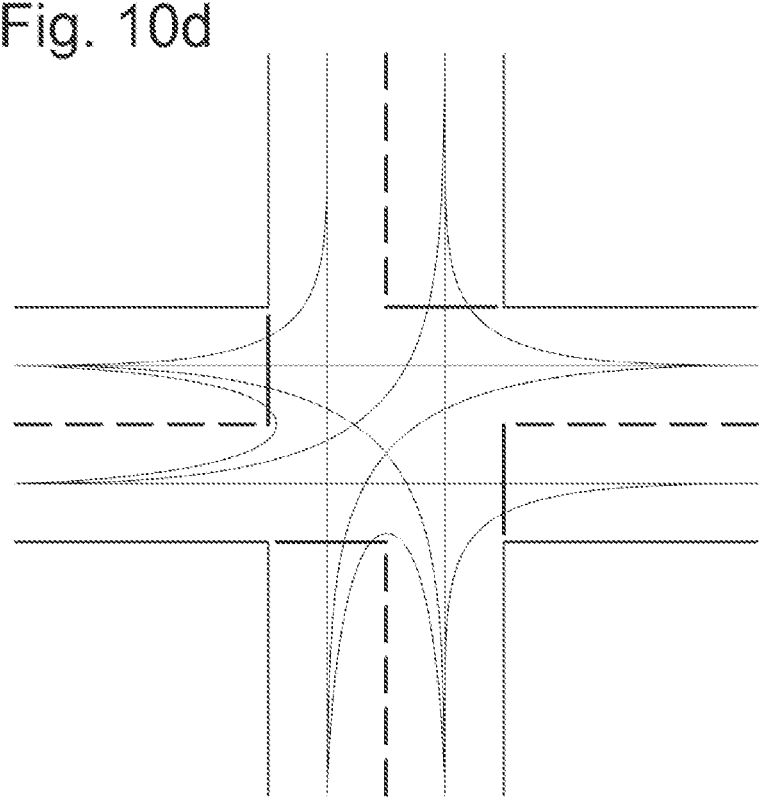
Figure 10E:
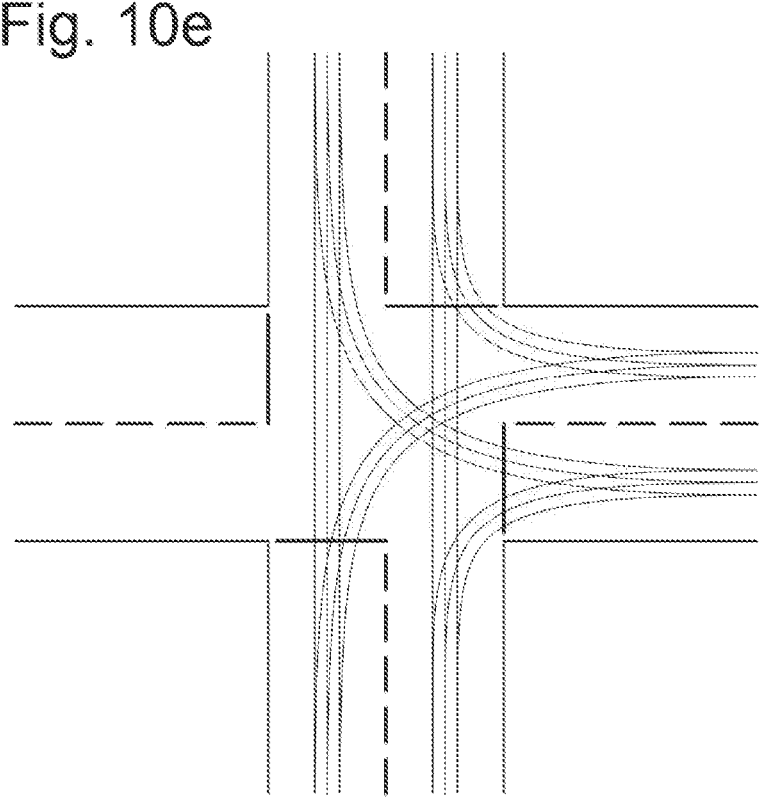

As explained above, similar driving behaviour of the first and second vehicles may indicate that there is a potential cause of accident that needs investigating and for this purposes the controller may examine traffic flow data. For example, traffic flow data may indicate that the flow of traffic at the location 1000 is departing from normal (the normal being indicated by the average traffic flow 1003). FIGS. 10c, 10d and 10e indicate traffic flow data that deviate from the normal traffic flow as indicated in FIG. 10b.

FIG. 10c shows unusual traffic data (unusual in the sense that it is different to the normal traffic flow data as indicated by 1003 in FIG. 10b) in that each driver appears to be U-turning when approaching, or at, the intersection. The similar behaviour of the first and second vehicles may comprise both vehicles prematurely slowing, or braking, (e.g. by monitoring the parameter of speed and/or brake pedal pressure) when approaching the junction and/or monitoring the rate of change of steering wheel angle may indicate the vehicles turning more sharply than usual (potentially indicating a U-turn). The traffic flow data of FIG. 10c suggests that drivers are U-turning at or approaching the intersection, suggesting that there is a potential accident risk in the middle of the intersection. In the example where the received traffic flow data comprises the data as in FIG. 10c, the controller is configured to issue an alert.

FIG. 10d shows another example of the traffic data deviating from normal. If the first and second vehicles are behaving similarly, as described above, and the received traffic data indicates a traffic flow similar to FIG. 10d, then this suggests that drivers are avoiding turning left from the south road to the west road, suggesting that there is a potential accident risk on the corner of the south and west roads. In the example where the received traffic flow data comprises the data as in FIG. 10d, the controller is configured to issue an alert.

FIG. 10e shows another example of the traffic data deviating from normal. If the first and second vehicles are behaving similarly, as described above, and the received traffic data indicated a traffic flow similar to FIG. 10e, then this suggests that drivers are avoiding the west road. In the example where the received traffic flow data comprises the data as in FIG. 10e, the controller is configured to issue an alert.

In another example where the driving behaviour of the first and second vehicles are similar but the traffic flow data indicates a normal flow (e.g. the traffic flow data received is similar to that shown in FIG. 10b) and/or the road geography indicates that no obstacle is present proximate the first and second vehicles, then no alert may be issued as it may be effectively concluded that there is no risk of accident.

In each example the determination that the traffic flow patterns, e.g. those shown in FIGS. 10c, 10d, and 10e, differ from the normal traffic flow pattern, e.g. that shown in FIG. 10*b*, may be done by computing a measure of difference between the flow patterns (of FIGS. 10*c-e*) and the normal flow pattern 1003. For example the measure of difference may comprise treating the normal flow curve 1003 as a regression line and computing the residuals between the values of the curve of the traffic flow pattern (e.g. those shown in FIGS. 10*c-e*), e.g. at a plurality of points along an axis (e.g. an assigned 'x'-axis being parallel to one of the roads in the virtual road map), and then summing up the absolute value of each residual. The measure of difference may be said to be below a threshold when the sum of the absolute value of each residual is below the threshold. In this way it may be determined that the lower the sum of the absolute value of each residual, the more the traffic flow curve is identical to the normal traffic flow curve 1003.

Although the traffic flow, and the traffic flow data, schematically depicted in the examples of FIG. 10 it is to be understood that this is for exemplary purposes only. It is to be understood that in other examples the virtual representation of traffic flow may comprise a 3-dimensional grid, or volume, and the flow paths may comprise 3-dimensional curves in the 3-dimensional volume. Whilst a 2-dimensional representation may be suitable for representing plan view of a road space, in examples when the vehicle comprises an aircraft or marine vessel the 3-dimensional representation may comprise a volume that is a visual representation of the sky, or ocean, with the paths of the vehicles in these examples extending in three dimensions.

Although the controller is configured to issue the alert when the first and second vehicle are behaving similarly and the traffic flow data indicates a departure from normal and/or the geographic data indicates the presence of an obstacle proximate the first and second vehicles, in some examples the controller will not issue an alert. In some examples, the issuance of an alert will depend on historical data relating to whether any accidents have occurred in, around, on, or proximate to the given location.

For example, the controller (e.g. the controller 710, 810, or 910) is configured to receive historical accident-related data to determine whether an accident has occurred at the given location. If an accident has occurred at the given location (as determined by the presence of historical accident data) then, in some examples, the controller may not send an alert as the accident data indicates that the given location being an accident risk is known, e.g. to a local authority.

The controller 710, 810, 910 may also be configured to instruct a vehicle (for example a vehicle remote from the controller or a vehicle comprising the controller) approaching the intersection to driver away under autonomous control (e.g. to avoid the potential accident risk), or to instruct a route guidance system to re-program the vehicle's destination to avoid the given location. The controller may be configured to issue an alert comprising instructions which, when executed by a vehicle, cause the vehicle to change its autonomous driving style and/or parameters, and/or to change the route guidance of the vehicle.

Figure 11:
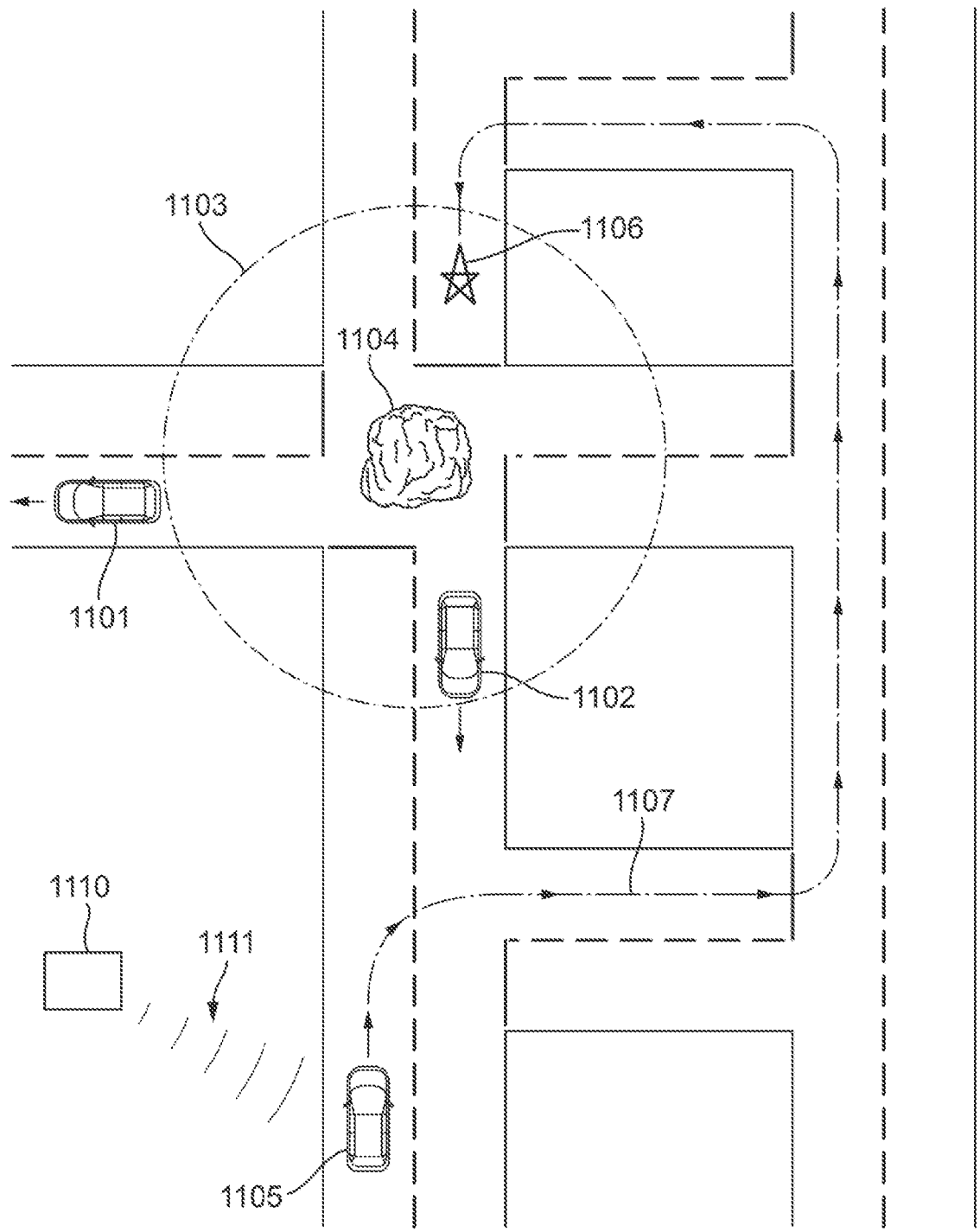
FIG. 11 is a schematic diagram showing an example road layout and a path through the example road layout taking into account the potential accident risk of a location in the example road layout.

This is shown in FIG. 11. In FIG. 11, a first vehicle 1101 and a second vehicle 1102 have exhibited the same driving behaviour due to the presence of an accident risk indicated schematically at 1104. Due to either traffic flow data (such as that indicated in FIG. 11*c*) and/or geographic data (such as indicated by the tree 920*a* in FIG. 9), a controller 1110 (that may comprise the controller 710, 810, 910) issues an alert, comprising the signal 1111, to a third vehicle 505 approaching the given location 1103. At the time of determining the risk of a presence of an accident in the given location 1103 (indicated schematically by the dotted circle) the first and second vehicles 1110, 1102 were approaching, or were inside of the given location 1103, travelling north on the south road, but at the current time frame (snapshotted in the schematic of FIG. 11) each driver has taken a course of action in view of the accident risk 1104. For example, the driver of vehicle 1101 has turned left on to the west road and the driver of vehicle 1102 has U-turned to travel south on the south road. The third vehicle 1105 has, as its end destination, the point indicated by the star 1106. Under normal traffic conditions, the vehicle 1105 would be able to travel north on the south road, cross the intersection that is at the centre of the given location 1103. However, the alert 1111 being transmitted by the controller 1110 to the vehicle 1105 takes into account the driving behaviour of the first and second vehicles 1101, 1102 and that they were exhibiting this driving behaviour in order to avoid an accident at 1104, and comprises instructions that, when executed by the vehicle 1105 (e.g. a processor or controller thereof), cause the vehicle 1105 to either drive to the end destination 1106, under autonomous control, taking a route that avoids the location 1104, or cause a route guidance system of the vehicle 1105 to reprogram its route to the destination 1106 that avoids the location 1104. This new route is indicated by the dotted arrows 1107. In this example, in view of the vehicle 1105 being unable to travel on a usual route to 1106, the vehicle 1105 takes, or a driver of the vehicle 1105 is instructed to take, the new route 1107 to the destination 1106 that avoids the accident-risk location 1104.

In another example, the first and/or second vehicles behaviour may be used to instruct the vehicle 1105. For example, in FIG. 11 each of the first and second vehicles have taken a different course of action to avoid the location 1104 and vehicle 1105 takes a further different course of action, in turning right before it is at the given location 1103. However in another example the vehicle 1105 may be instructed to mimic, or substantially mimic, the actions taken by the first and/or second vehicles. For example, the vehicle 1105 (or the driver thereof) may be instructed to enter the intersection but turn left, following vehicle 1101, or U-turn, following vehicle 1102, to avoid the location 1104. In other examples, the vehicle 1105 may be instructed to deviate from the actions taken by the first and/or second vehicles.

It will be appreciated that where the controller 1110 is disposed on a vehicle then each of the vehicles 1101, 1102, 1105 may comprise its own controller that can effectively build up a network of vehicle-to-vehicle communication where each controller of each vehicle can send a signal that instructs a controller of another vehicle, e.g. in the manner described with reference to FIG. 11.

Figure 12:
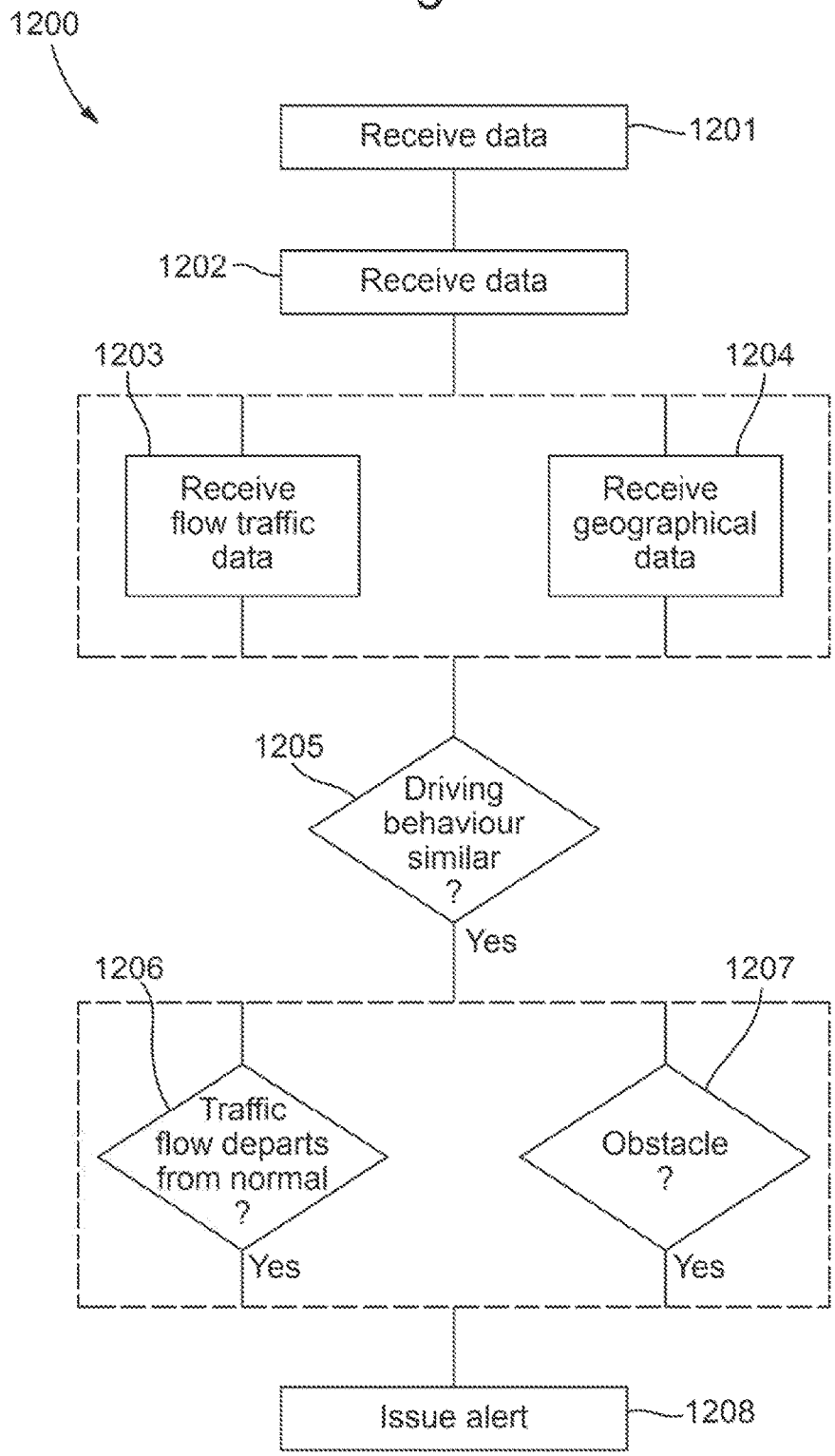
FIG. 12 is a flowchart of an example method.

FIG. 12 shows an example method 1200 which may be a computer-implemented method. Any one of the controllers 710, 810, 910, and 1110 may be configured to perform the method 1200 of FIG. 12.

At block 1201 the method comprises receiving data relating to a first performance parameter of a first vehicle at a given location to determine a driving behaviour of the first vehicle. At block 1202 the method comprises receiving data relating to a second performance parameter of a second vehicle at the given location to determine a driving behaviour of the second vehicle. Block 1203 comprises receiving data relating to a flow of traffic at the given location, and block 1204 comprises receiving data relating to a geography at the given location. As indicated by the doted box, blocks 1203 and 1204 may be performed alternatively, or in addition to one another. Block 1205 comprises determining whether the driving behaviour of the first vehicle and the driving behaviour of the second vehicle are the same, or similar within a predetermined first threshold and, if so, blocks 1206 and 1207, respectively comprise determining whether the flow of traffic at the given location departs from a normal traffic flow, and determining whether the geography at the given location increases the risk of accident. The dotted box indicates that blocks 1206 and 1207 may be performed alternatively, or in addition to one another. If yes, block 1208 comprises issuing an alert.

The method 1200 may comprise receiving data relating to accidents that have occurred within a predetermined threshold of the given location. The method 1200 may comprise receiving data relating to, or describing, a normal traffic flow through the given location (for example as described above in relation to FIGS. 10*a* and 10*b*). The method 1200 may comprise determining a normal traffic flow through the given location (for example as described above in relation to FIG. 10*b*). The method 1200 may comprise determining a measure of difference between the flow of traffic (e.g. the current flow of traffic, or the flow of traffic within a certain time of the current time) at the given location and determining whether flow departs from normal may be based on the measure of difference (e.g. whether the measure of difference is above a predetermined threshold).

Figure 13:
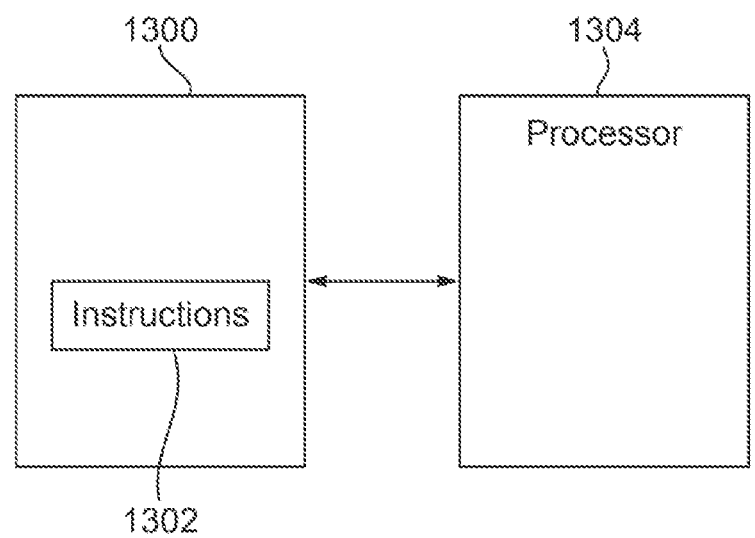
FIG. 13 is an example non-transitory machine-readable medium in association with a processor.

FIG. 13 shows an example non-transitory and machine- (or computer-) readable storage medium 1300 comprising a set of machine- (or computer-) readable instructions 1302 (e.g. stored thereon) which, when executed by a 1304 processor (e.g. a controller for a vehicle such as the controller 710, 810, 910, 1110) cause the processor to perform the method 1200 as discussed in relation to the example of FIG. 12.

Examples of the present disclosure may be provided according to one of the following numbered statements:

Statement 1. A method comprising:
selecting a first location from a set of locations;
analysing, by a processor, data collected from a first vehicle located within a first distance of the first location;
generating a first value representative of a first parameter of the first vehicle;
comparing the first value with a first threshold; and
depending on whether the first value is greater than (in some examples, less than) the first threshold, issuing an alert.

Statement 2. The method of Statement 1 wherein the first parameter is at least one of: the brake pedal pressure of the first vehicle, the speed of the first vehicle, the speed of the first vehicle engine, the steering wheel angle of the first vehicle, the accelerator pressure of the first vehicle, the state of at least one indicator of the first vehicle, the gear of the first vehicle, and the first vehicle type.

Statement 3. The method of Statement 1 or 2, the method further comprising:
generating a plurality of values, wherein each value of the plurality is representative of a parameter of the first vehicle, and wherein the first value is one of the plurality;
comparing each one of the plurality of values to a respective threshold value; and
depending on whether each one of the values is greater than (in some examples, less than) its respective threshold, issuing an alert.

Statement 4. The method of Statement 3 wherein each value of the plurality is one of: the brake pedal pressure of the first vehicle, the speed of the first vehicle, the speed of the first vehicle engine, the steering wheel angle of the first vehicle, the accelerator pressure of the first vehicle, the state of at least one indicator of the first vehicle, the gear of the first vehicle, and the first vehicle type.

Statement 5. The method of Statement 1, wherein the first parameter is brake pedal pressure and the first value is a brake pedal pressure value and the first threshold is a brake pedal pressure threshold, the method further comprising:
generating a vehicle speed value representative of the speed of the first vehicle;
generating an engine speed value representative of the engine speed of the first vehicle;
comparing the vehicle speed value to a vehicle speed threshold;
comparing the engine speed value to an engine speed threshold; and,
when the brake pedal pressure value is less than the brake pedal pressure threshold and the vehicle speed value is greater than the vehicle speed threshold and the engine speed value is greater than the engine speed threshold, issuing an alert.

Statement 6. The method of any preceding statement wherein the alert is issued in real-time or near real-time.

Statement 7. The method of any preceding statement wherein the alert is issued to the driver of the first vehicle, or is issued at a location remote from the vehicle.

Statement 8. The method of any preceding statement wherein selecting the first location from the set of locations comprises:
analysing, by a processor, location data collected from a monitoring service of a computing system, the location data comprising a set of location data points;
generating, for each location data point in the location data, a location value representative of a first location parameter of the location data;
comparing each location value with a first location threshold to determine the set of location data points that have a location value greater than, or less than, the first location threshold; and
selecting one of the location data points that has a location value greater than, or less than, the first location threshold as the first location.

Statement 9. The method of Statement 8 wherein the location data point in the set of location data points having a location value exceeding the first location threshold that is the closest in distance to the location of the first vehicle is selected as the first location.

Statement 10. The method of Statement 8 or 9 wherein the first location parameter is at least one of: the number of traffic accidents that have occurred at each location data point, the average severity of the traffic accidents that have occurred at that location data point, the traffic data at that location data point, the weather at that location data point, the time of day, the road surface at that location data point.

Statement 11. The method of Statement 8 further comprising:
generating, for each location data point in the location data, a plurality of values, wherein each one of the plurality of values is representative of a location parameter of the location data, the location value being one of the plurality;
comparing each one of the plurality of values to a respective threshold; and wherein selecting the first location is based on the comparison.

Statement 12. The method of any preceding statement further comprising:
  generating a second value representative of a second parameter of the first vehicle;
  comparing the second value with at least one of: the behaviour of at least one vehicle within a second distance of the first vehicle and the behaviour of at least one pedestrian within a third distance of the first vehicle;
  and wherein the alert is issued based on the comparison of the second value.

Statement 13. The method of any preceding statement further comprising:
  analysing, by a processor, data collected from a second vehicle located within a third distance of the first location;
  generating a second value representative of the first parameter of the second vehicle;
  comparing the second value with the first threshold; and
  depending on whether the first and second values are greater than (in some examples, less than) the first threshold, issuing an alert.

Statement 14. The method of Statement 1, the method further comprising:
  generating a first plurality of values, wherein each value of the first plurality is representative of a first parameter of the first vehicle, and wherein the first value is one of the first plurality;
  generating a second plurality of values, wherein each value of the second plurality is representative of a second parameter of a second vehicle, the second vehicle being within a fourth distance of the first location;
  comparing each one of the first and second pluralities of values to a respective threshold value; and
  depending on whether each one of the values is greater than (in some examples, less than) its respective threshold, issuing an alert.

Statement 15. The method of Statement 14 wherein each value of the first and second pluralities is one of: the brake pedal pressure of the first vehicle, the speed of the first vehicle, the speed of the first vehicle engine, the steering wheel angle of the first vehicle, the accelerator pressure of the first vehicle, the state of at least one indicator of the first vehicle, the gear of the first vehicle, and the first vehicle type.

Statement 16. A processing apparatus comprising:
  a location module configured to select a first location from a set of locations;
  a processor configured to analyse data collected from a first vehicle located within a first distance of the first location;
  an analytics module configured to generate a first value representative of a first parameter of the first vehicle, and configured to comparing the first value with a first threshold; and configured to issue an alert depending on whether the first value is greater than (in some examples, less than) the first threshold.

Statement 17. The processing apparatus of Statement 16 wherein
  the analytics module is configured to generate a plurality of values, wherein each value of the plurality is representative of a parameter of the first vehicle, and wherein the first value is one of the plurality, configured to compare each one of the plurality of values to a respective threshold value; and configured to issue an alert depending on whether each one of the values is greater than (in some examples, less than) its respective threshold.

Statement 18. The processing apparatus of Statement 16 wherein the first parameter is brake pedal pressure and the first value is a brake pedal pressure value and the first threshold is a brake pedal pressure threshold, and wherein the analytics module is configured to:
  generate a vehicle speed value representative of the speed of the first vehicle;
  generate an engine speed value representative of the engine speed of the first vehicle;
  compare the vehicle speed value to a vehicle speed threshold;
  compare the engine speed value to an engine speed threshold; and,
  issue an alert when the brake pedal pressure value is less than the brake pedal pressure threshold and the vehicle speed value is greater than the vehicle speed threshold and the engine speed value is greater than the engine speed threshold.

Statement 19. The processing apparatus of any one of statements 16-18 wherein the analytics module is configured to issue the alert in real-time or near real-time.

Statement 20. The processing apparatus of any one of statements 16-19 wherein the analytics module is configured to issue the alert to the driver of the first vehicle, or at a location remote from the vehicle.

Statement 21. The processing apparatus of any one of statements 16-20, wherein the processor is a first processor, the apparatus further comprising a second processor configured to analyse location data collected from a monitoring service of a computing system, the location data comprising a set of location data points; and wherein the analytics module is a first analytics module, the apparatus further comprising a second analytics module configured to:
  generate, for each location data point in the location data, a location value representative of a first location parameter of the location data;
  compare each location value with a first location threshold to determine the set of location data points that have a location value greater than, or less than, the first location threshold; and
  select one of the location data points that has a location value greater than, or less than, the first location threshold as the first location.

Statement 22. The processing apparatus of Statement 16 wherein the analytics module is configured to:
  generate, for each location data point in the location data, a plurality of values, wherein each one of the plurality of values is representative of a location parameter of the location data, the location value being one of the plurality;
  compare each one of the plurality of values to a respective threshold;
  and to select the first location based on the comparison.

Statement 23. The processing apparatus of statement 16 wherein the analytics module is configured to:
  generate a second value representative of a second parameter of the first vehicle;
  compare the second value with at least one of: the behaviour of at least one vehicle within a second distance of the first vehicle and the behaviour of at least one pedestrian within a third distance of the first vehicle;
  and to issue the alert based on the comparison of the second value.

Statement 24. The processing apparatus of statement 16 further comprising a processor configured to analyse data collected from a second vehicle located within a third distance of the first location; and wherein the event analytics module is configured to:
  generate a second value representative of the first parameter of the second vehicle;
  compare the second value with the first threshold; and
  to issue an alert depending on whether the first and second values are greater than (in some examples, less than) the first threshold.

Statement 25. The processing apparatus of Statement 16, wherein the analytics module is configured to:
  generate a first plurality of values, wherein each value of the first plurality is representative of a first parameter of the first vehicle, and wherein the first value is one of the first plurality;
  generate a second plurality of values, wherein each value of the second plurality is representative of a second parameter of a second vehicle, the second vehicle being within a fourth distance of the first location;
  compare each one of the first and second pluralities of values to a respective threshold value; and
  issue an alert depending on whether each one of the values is greater than (in some examples, less than) its respective threshold.

Statement 26. A non-transitory machine-readable storage medium, encoded with instructions executable by a processor, the machine-readable storage medium comprising instructions to cause the processor to perform the method of any of Statements 1-15.

Statement 27. A method comprising:
  analysing, by a processor, location data collected from a monitoring service of a computing system, the location data comprising a set of location data points;
  generating, for each location data point in the location data, a location value representative of a first location parameter of the location data;
  comparing each location value with a location threshold to determine the set of location data points that have a location value greater than, or less than, the first location threshold; and
  issuing an alert when one of the location values exceeds the location threshold.

Statement 28. The method of Statement 27 where the alert is issued in real-time or near real-time.

Statement 29. A method comprising:
  selecting a first location from a set of locations;
  analysing, by a processor, data collected from a first vehicle located within a first distance of the first location;
  generating a first value representative of a first performance parameter of the first vehicle;
  generating a second value representative of a second performance parameter of the first vehicle;
  comparing at least one of the first and second values with a first threshold; and, when one of the first and second values is greater than the first threshold, issuing a safety alert.

Statement 30. The method of Statement 29 wherein at least one of the first and second performance parameters is at least one of: the brake pedal pressure of the first vehicle, the speed of the first vehicle, the speed of the first vehicle engine, the steering wheel angle of the first vehicle, the accelerator pressure of the first vehicle, the rate of change of the steering wheel angle of the first vehicle, the state of at least one indicator of the first vehicle, the gear of the first vehicle, and the first vehicle type.

Statement 31. The method of Statement 29 further comprising:
  assigning a level of traffic safety to the first location.

Statement 32. The method of Statement 29 further comprising:
  storing the first location in a database.

Statement 33. The method of Statement 29 wherein the alert is issued in real-time or near real-time.

Statement 34. The method of Statement 29 wherein the alert is issued to the driver of the first vehicle, or is issued at a location remote from the vehicle.

Statement 35. The method of Statement 29 wherein selecting the first location from the set of locations comprises:
  analysing, by a processor, location data collected from a monitoring service of a computing system, the location data comprising a set of location data points;
  generating, for each location data point in the location data, a location value representative of a first location parameter of the location data;
  comparing each location value with a first location threshold to determine the set of location data points that have a location value greater than, or less than, the first location threshold; and
  selecting one of the location data points that has a location value greater than, or less than, the first location threshold as the first location.

Statement 36. The method of Statement 35 wherein the first location parameter is at least one of: the number of traffic accidents that have occurred at each location data point, the average severity of the traffic accidents that have occurred at that location data point, the traffic data at that location data point, the weather at that location data point, the time of day, the road surface at that location data point.

Statement 37. The method of Statement 36 further comprising:
  generating, for each location data point in the location data, a plurality of values, wherein each one of the plurality of values is representative of a location parameter of the location data, the location value being one of the plurality;
  comparing each one of the plurality of values to a respective threshold; and wherein selecting the first location is based on the comparison.

Statement 38. The method of Statement 29 wherein the threshold is based on at least one of the behaviour of at least one vehicle within a second distance of the first vehicle and the behaviour of at least one pedestrian within a third distance of the first vehicle; and wherein the alert is issued based on the comparison of the second value.

Statement 39. The method of Statement 29 further comprising:
  analysing, by a processor, data collected from a second vehicle located within a third distance of the first location;
  generating a third value representative of the third performance parameter of the second vehicle;
  comparing the third value with a second threshold; and, when the third value is greater than the second threshold, issuing an alert.

Statement 40. A processing apparatus comprising:
  a location module configured to select a first location from a set of locations;

a processor configured to analyse data collected from a first vehicle located within a first distance of the first location;

an analytics module configured to generate a first value representative of a first performance parameter of the first vehicle and a second value representative of a second performance parameter of the first vehicle, and configured to compare at least one of the first and second values with a first threshold; and configured to issue an alert when the first value is greater than the first threshold.

Statement 41. A non-transitory machine-readable storage medium, encoded with instructions executable by a processor, the machine-readable storage medium comprising instructions to cause the processor to perform the method of Statement 29.

Statement 42. A controller for a vehicle, the controller being configured to receive:

data relating to a first performance parameter of a first vehicle at a given location to determine a driving behaviour of the first vehicle; and data relating to a second performance parameter of a second vehicle at the given location to determine a driving behaviour of the second vehicle, wherein the controller is configured to receive data relating to at least one of:

a flow of traffic at the given location; and a geography at the given location, and, if the controller determines that the driving behaviour of the first vehicle and the driving behaviour of the second vehicle are the same, or similar within a predetermined first threshold, and the controller determines that at least one of:

the flow of traffic at the given location departs from a normal traffic flow; and the geography at the given location increases the risk of accident, then the controller is configured to issue an alert.

Statement 43. A controller as in Statement 42 wherein the controller is configured to receive data relating to accidents that have occurred within a predetermined threshold of the given location.

Statement 44. A controller as in Statement 43 wherein the controller is configured to determine whether an accident has occurred within the predetermined threshold.

Statement 45. A controller as in Statement 44 wherein the controller is configured to issue the alert based on whether an accident has occurred within the predetermined threshold.

Statement 46. A controller as in Statement 44 or 45 wherein, if the controller determines that an accident has not occurred within the predetermined threshold then the controller is configured to issue the alert.

Statement 47. A controller as in Statement 44 or 45 wherein, if the controller determines that an accident has occurred within the predetermined threshold then the controller is configured to issue the alert, optionally wherein the alert comprises metadata describing the accident that has occurred within the predetermined threshold.

Statement 48. A controller as in any of Statements 42-47 wherein at least one of the first and second performance parameters comprises at least one of: brake pedal pressure, speed, engine speed, the steering wheel angle, rate of change of input to the accelerator pedal, rate of change of position of the accelerator pedal, rate of change of steering wheel angle, the gear of the vehicle, the temporal and/or geospatial movement of the vehicle, accelerometer data, driver controls, vehicle functional status, vehicle operational status.

Statement 49. A controller as in any of Statements 42-48 wherein each of the first and second performance parameters comprises at least one of: brake pedal pressure, speed, engine speed, the steering wheel angle, rate of change of input to the accelerator pedal, rate of change of position of the accelerator pedal, rate of change of steering wheel angle, the gear of the vehicle, the temporal and/or geospatial movement of the vehicle, accelerometer data, driver controls, vehicle functional status, vehicle operational status.

Statement 50. A controller as in any of Statements 42-49 wherein, to determine whether the driving behaviour of the first vehicle and the driving behaviour of the second vehicle are the same, or similar within the predetermined threshold, the controller is configured to compute a measure of difference between the first and second performance parameters and to determine that the first and second driving behaviours are the same, or similar within the predetermined threshold, if the measure of difference is zero, or less than a predetermined threshold.

Statement 51. A controller as in any of Statements 42-50 wherein, to determine whether the driving behaviour of the first vehicle and the driving behaviour of the second vehicle are the same, or similar within the predetermined threshold, the controller may be configured to compute a measure of difference between the first performance parameter and a predetermined threshold, and to compute a measure of difference between the second performance parameter and a predetermined threshold, and the determination that the first and second driving behaviours are the same, or similar within the predetermined threshold, is based on each measure of difference.

Statement 52. A controller as in Statement 51 wherein, to compute the measure of difference, the controller is to determine the difference between the value of the first and second performance parameters.

Statement 53. A controller as in any of Statements 42-52 wherein the controller is configured to receive data describing a normal traffic flow through the given location.

Statement 54. A controller as in any of Statements 42-53 wherein the controller is configured to determine a normal traffic flow through the given location.

Statement 55. A controller as in Statement 53 or 54 wherein the controller is configured to determine a measure of difference between the flow of traffic and the normal flow of traffic and the controller is to determine that the flow of traffic departs from the normal flow of traffic when the measure of difference is above a predetermined threshold.

Statement 56. A controller as in any of Statements 42-55 wherein the data relating to the flow of traffic at the given location comprises a virtual representation of the given location, the virtual representation comprising a plurality of virtual traffic paths, each virtual traffic path representing the historical movement of a vehicle through the given location.

Statement 57. A controller as in Statement 56 wherein virtual representation comprises a 2-dimensional or 3-dimensional grid and wherein the virtual traffic paths are lines on the 2-dimensional or 3-dimensional grid.

Statement 58. A controller as in Statement 56 or 57 wherein the controller is the controller is configured to average at least a portion of the plurality of virtual traffic flow paths to determine a normal traffic flow through the given location being the average of the virtual traffic flow paths.

Statement 59. A controller as in any of Statements 42-58 wherein the data relating to a geography at the given location comprises data describing an obstacle within a predetermined distance of the given location.

Statement 60. A controller as in Statement 59 wherein the controller is configured to determine that the geography at the given location increases the risk of accident if there is an obstacle within the predetermined distance of the given location.

Statement 61. A controller as in Statement 59 or 60 wherein the obstacle comprises at least one of: a parked vehicle, roadworks, a sign, a tree, a building, a kerb, a road marking, a road gradient, a sight line, a position of the sun, lighting on the road, dustbin, bollard, lamppost, or bush etc.

Statement 62. A controller as in any of Statements 42-61 wherein the controller is configured to receive data (e.g. data relating to a flow of traffic at the given location and/or a geography at the given location) from a smart device (e.g. from a smart camera or smartphone).

Statement 63. A controller as in any of Statements 42-62, wherein the controller is configured to issue the alert to at least one of: a local authority, a fleet manager (e.g. of the first and/or second vehicle), a driver of a vehicle (e.g. the first and/or second vehicle).

Statement 64. A controller as in any of Statements 42-63 wherein issuing the alert comprises causing an alarm to sound. In other words, if the controller determines that the driving behaviour of the first vehicle and the driving behaviour of the second vehicle are within a predetermined first threshold and the controller determines that at least one of:
  the flow of traffic at the given location departs from a normal traffic flow; and
  the geography at the given location increases the risk of accident,
  then the controller is configured to cause an alarm to sound.

Statement 65. A controller as in any of Statements 42-64 wherein the alert comprises metadata describing the deviation from the normal traffic flow and/or how the geography increases the risk of accident (e.g. whether an obstacle is present, the type and/or position of an obstacle etc.).

Statement 66. A controller as in any of Statements 42-65 wherein the controller is configured to issue the alert to at least one of:
  all vehicles within a predetermined threshold of the given location; and
  all vehicles travelling towards the given location.

Statement 67. A controller as in any of Statements 42-66 wherein the controller is configured to issue an alert to a third vehicle, and wherein the alert comprises machine-readable instructions that, when executed by the third vehicle (e.g. a controller and/or processor thereof) cause the third vehicle to at least one of:
  drive away from the given location under autonomous control; and
  mimic (or deviate from) the driving behaviour of at least one of the first and second vehicle.

Statement 68. A controller as in any of Statements 42-67 wherein the controller is configured to issue an alert to a vehicle route guidance system, and wherein the alert comprises machine-readable instructions that, when executed by the route guidance system, cause the route guidance system to recalculate a route to a target destination that avoids the given location.

Statement 69. A vehicle comprising the controller of any of Statements 42-68.

Statement 70. A vehicle as in Statement 28 wherein the vehicle is the first vehicle and/or the second vehicle.

Statement 71. A method comprising:
  receiving data relating to a first performance parameter of a first vehicle at a given location to determine a driving behaviour of the first vehicle; and
  receiving data relating to a second performance parameter of a second vehicle at the given location to determine a driving behaviour of the second vehicle,
  receiving data relating to at least one of:
    a flow of traffic at the given location; and
    a geography at the given location,
  determining whether the driving behaviour of the first vehicle and the driving behaviour of the second vehicle are the same, or similar within a predetermined first threshold and
  determining at least one of:
    whether the flow of traffic at the given location departs from a normal traffic flow; and
    whether the geography at the given location increases the risk of accident, and if it is determined that the driving behaviour of the first vehicle and the driving behaviour of the second vehicle are the same, or similar within a predetermined first threshold, and if it is determined that at least one of:
      the flow of traffic at the given location departs from a normal traffic flow; and
      the geography at the given location increases the risk of accident, issuing an alert.

Statement 72. A method as in Statement 71 further comprising:
  receiving data relating to accidents that have occurred within a predetermined threshold of the given location.

Statement 73. A method as in Statement 72 further comprising:
  determining whether an accident has occurred within the predetermined threshold.

Statement 74. A method as in Statement 73 wherein the alert is issued based on whether an accident has occurred within the predetermined threshold.

Statement 75. A method as in Statement 73 or 74 wherein, if it is determined that an accident has not occurred within the predetermined threshold then the method comprises:
  issuing the alert.

Statement 76. A method as in Statement 73 or 74 wherein, if it is determined that an accident has occurred within the predetermined threshold then the method comprises:
  issuing the alert,
  optionally wherein the alert comprises metadata describing the accident that has occurred within the predetermined threshold.

Statement 77. A method as in any one of Statements 71-76 wherein at least one of the first and second performance parameters comprises at least one of: brake pedal pressure, speed, engine speed, the steering wheel angle, rate of change of input to the accelerator pedal, rate of change of position of the accelerator pedal, rate of change of steering wheel angle, the gear of the vehicle, the temporal and/or geospatial movement of the vehicle, accelerometer data, driver controls, vehicle functional status, vehicle operational status.

Statement 78. A method as in any one of Statements 71-77 wherein each of the first and second performance parameters comprises at least one of: brake pedal pressure, speed, engine speed, the steering wheel angle, rate of change of input to the accelerator pedal, rate of change of position of the accelerator pedal, rate of change of steering wheel angle, the gear of the vehicle, the temporal and/or geospatial movement of the vehicle, accelerometer data, driver controls, vehicle functional status, vehicle operational status.

Statement 79. A method as in any one of Statements 71-78 wherein determining whether the driving behaviour of the first vehicle and the driving behaviour of the second vehicle are the same, or similar within the predetermined threshold, comprises computing a measure of difference between the first and second performance parameters, and determining that the first and second driving behaviours are the same, or similar within the predetermined threshold, comprises determining that the measure of difference is zero, or less than a predetermined threshold.

Statement 80. A method as in any one of Statements 71-79 wherein determining whether the driving behaviour of the first vehicle and the driving behaviour of the second vehicle are the same, or similar within the predetermined threshold, comprises computing a measure of difference between the first performance parameter and a predetermined threshold, and computing a measure of difference between the second performance parameter and a predetermined threshold, and wherein determining whether the first and second driving behaviours are the same, or similar within the predetermined threshold, is based on each measure of difference.

Statement 81. A method as in Statement 80 wherein computing the measure of difference comprises determining the difference between the value of the first and second performance parameters.

Statement 82. A method as in any one of Statements 71-81 comprising:
  receiving data describing a normal traffic flow through the given location.

Statement 83. A method as in any one of Statements 71-82 comprising:
  determining a normal traffic flow through the given location.

Statement 84. A method as in Statement 82 or 83 further comprising:
  determining a measure of difference between the flow of traffic and the normal flow of traffic, and determine that the flow of traffic departs from the normal flow of traffic when the measure of difference is above a predetermined threshold.

Statement 85. A method as in any one of Statements 71-84 wherein the data relating to the flow of traffic at the given location comprises a virtual representation of the given location, the virtual representation comprising a plurality of virtual traffic paths, each virtual traffic path representing the historical movement of a vehicle through the given location.

Statement 86. A method as in Statement 85 wherein virtual representation comprises a 2-dimensional or 3-dimensional grid and wherein the virtual traffic paths are lines on the 2-dimensional or 3-dimensional grid.

Statement 87. A method as in Statement 85 or 86 further comprising:
  averaging at least a portion of the plurality of virtual traffic flow paths to determine a normal traffic flow through the given location being the average of the virtual traffic flow paths.

Statement 88. A method as in any one of Statements 71-87 wherein the data relating to a geography at the given location comprises data describing an obstacle within a predetermined distance of the given location.

Statement 89. A method as in Statement 88 further comprising:
  determining that the geography at the given location increases the risk of accident if there is an obstacle within the predetermined distance of the given location.

Statement 90. A method as in Statement 88 or 89 wherein the obstacle comprises at least one of: a parked vehicle, roadworks, a sign, a tree, a building, a kerb, a road marking, a road gradient, a sight line, a position of the sun, lighting on the road, dustbin, bollard, lamppost, or bush etc.

Statement 91. A method as in any one of Statements 71-90 wherein receiving data (e.g. data relating to a flow of traffic at the given location and/or a geography at the given location) comprises receiving data from a smart device (e.g. from a smart camera or smartphone).

Statement 92. A method as in any one of Statements 71-91 wherein issuing the alert comprises:
  issuing the alert to at least one of: a local authority, a fleet manager (e.g. of the first and/or second vehicle), a driver of a vehicle (e.g. the first and/or second vehicle).

Statement 93. A method as in any one of Statements 71-92 wherein issuing the alert comprises causing an alarm to sound.

Statement 94. A method as in any one of Statements 71-93 wherein the alert comprises metadata describing the deviation from the normal traffic flow and/or how the geography increases the risk of accident (e.g. whether an obstacle is present, the type and/or position of an obstacle etc.).

Statement 95. A method as in any one of Statements 71-94 wherein issuing the alert comprises issuing the alert to at least one of:
  all vehicles within a predetermined threshold of the given location; and
  all vehicles travelling towards the given location.

Statement 96. A method as in any one of Statements 71-95 wherein issuing the alert comprises issuing an alert to a third vehicle, and wherein the alert comprises machine-readable instructions that, when executed by the third vehicle (e.g. a controller and/or processor thereof) cause the third vehicle to at least one of:
  drive away from the given location under autonomous control; and
  mimic (or deviate from) the driving behaviour of at least one of the first and second vehicle.

Statement 97. A method as in any one of Statements 71-96 wherein issuing the alert comprises issuing the alert to a vehicle route guidance system, and wherein the alert comprises machine-readable instructions that, when executed by the route guidance system, cause the route guidance system to recalculate a route to a target destination that avoids the given location.

Statement 98. A non-transitory machine-readable medium comprising instructions which, when executed by a processor, cause the processor to perform the method according to any of Statements 71-97.

While the present disclosure has been illustrated and described in detail in the drawings and foregoing description, such illustration and description are to be considered illustrative or exemplary and not restrictive; the disclosure is not limited to the disclosed embodiments. Various alternative examples are discussed through the detailed description. Other variations to the disclosed embodiments can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A controller for a vehicle, the controller being configured to:
    receive data relating to a first performance parameter of a first vehicle at a given location to determine a driving behaviour of the first vehicle; and
    receive data relating to a second performance parameter of a second vehicle at the given location to determine a driving behaviour of the second vehicle;
    receive data relating to at least one of: a flow of traffic at the given location and a geography at the given location;
    determine that the driving behaviour of the first vehicle and the driving behaviour of the second vehicle are the same or similar within a predetermined first threshold;
    determine, based on the determination that the driving behaviour of the first vehicle and the driving behaviour of the second vehicle are the same or similar within a predetermined first threshold, that an obstacle exists at the given location that increases the risk of accident; and
    issue an alert to a third vehicle, wherein the alert comprises machine-readable instructions that, when executed by the third vehicle cause the third vehicle to at least one of:
    drive away from the given location under autonomous control; and
    mimic the driving behaviour of at least one of the first and second vehicle.

2. A controller as claimed in claim 1, wherein the controller is configured to receive data relating to accidents that have occurred within a predetermined threshold of the given location.

3. A controller as claimed in claim 2, wherein, if the controller determines that an accident has not occurred within the predetermined threshold then the controller is configured to issue the alert.

4. A controller as claimed in claim 1, wherein at least one, or both, of the first and second performance parameters comprises at least one of: brake pedal pressure, speed, engine speed, steering wheel angle, rate of change of input to an accelerator pedal, rate of change of position of the accelerator pedal, rate of change of steering wheel angle, a gear of the vehicle, a temporal and/or geospatial movement of the vehicle, accelerometer data, driver controls, vehicle functional status, vehicle operational status.

5. A controller as claimed in claim 1, wherein, to determine whether the driving behaviour of the first vehicle and the driving behaviour of the second vehicle are the same, or similar within the predetermined first threshold, the controller is configured to compute a measure of difference between the first and second performance parameters and to determine that the first and second driving behaviours are the same, or similar within the predetermined first threshold, if the measure of difference is zero, or less than a predetermined threshold.

6. A controller as claimed in claim 1, wherein, to determine whether the driving behaviour of the first vehicle and the driving behaviour of the second vehicle are the same, or similar within the predetermined threshold, the controller may be configured to compute a measure of difference between the first performance parameter and a predetermined threshold, and to compute a measure of difference between the second performance parameter and a predetermined threshold, and the determination that the first and second driving behaviours are the same, or similar within the predetermined threshold, is based on each measure of difference.

7. A controller as claimed in claim 1, wherein the data relating to the flow of traffic at the given location comprises a virtual representation of the given location, the virtual representation comprising a plurality of virtual traffic paths, each virtual traffic path representing a historical movement of a vehicle through the given location, and wherein the controller is further configured to cause to present the virtual representation of the given location and the virtual traffic paths.

8. A controller as claimed in claim 7, wherein the controller is configured to average at least a portion of the plurality of virtual traffic flow paths to determine a normal traffic flow through the given location being the average of the virtual traffic flow paths, and wherein determining that an obstacle exists at the given location that increases a risk of accident is based on a comparison between the virtual traffic flow paths and the normal traffic flow.

9. A controller as claimed in claim 1, wherein the data relating to a geography at the given location comprises data describing an obstacle within a predetermined distance of the given location.

10. A controller as claimed in claim 1, wherein the controller is configured to issue the alert to at least one of:
    all vehicles within a predetermined threshold of the given location; and
    all vehicles travelling towards the given location.

11. A controller as claimed in claim 1, wherein the controller is configured to issue an alert to a vehicle route guidance system, and wherein the alert comprises machine-readable instructions that, when executed by the route guidance system, cause the route guidance system to recalculate a route to a target destination that avoids the given location.

12. A method comprising:
    receiving data relating to a first performance parameter of a first vehicle at a given location to determine a driving behaviour of the first vehicle;
    receiving data relating to a second performance parameter of a second vehicle at the given location to determine a driving behaviour of the second vehicle;
    receiving data relating to at least one of:
    a flow of traffic at the given location; and
    a geography at the given location;
    determining that the driving behaviour of the first vehicle and the driving behaviour of the second vehicle are the same, or similar within a predetermined first threshold;
    determining, based on the determination that the driving behaviour of the first vehicle and the driving behaviour of the second vehicle are the same or similar within a predetermined first threshold, that an obstacle exists at the given location that increases a risk of accident; and
    issuing an alert to a third vehicle, wherein the alert comprises machine-readable instructions that, when executed by the third vehicle cause the third vehicle to at least one of:
    drive away from the given location under autonomous control; and
    mimic the driving behaviour of at least one of the first and second vehicle.

13. A method as claimed in claim 12, further comprising:
    receiving data relating to accidents that have occurred within a predetermined threshold of the given location.

14. A method as claimed in claim 12, wherein determining whether the driving behaviour of the first vehicle and the driving behaviour of the second vehicle are the same, or similar within the predetermined threshold, comprises computing a measure of difference between the first and second performance parameters, and determining that the first and second driving behaviours are the same, or similar within the predetermined first threshold, comprises determining that the measure of difference is zero, or less than a predetermined threshold.

15. A method as claimed in claim 12, wherein determining whether the driving behaviour of the first vehicle and the driving behaviour of the second vehicle are the same, or similar within the predetermined threshold, comprises computing a measure of difference between the first performance parameter and a predetermined threshold, and computing a measure of difference between the second performance parameter and a predetermined threshold, and wherein determining whether the first and second driving behaviours are the same, or similar within the predetermined first threshold, is based on each measure of difference.

16. A method as claimed in claim 12, further comprising:
determining a measure of difference between received data describing a flow of traffic and a normal flow of traffic, and wherein determining that the flow of traffic departs from the normal flow of traffic comprises determining that the measure of difference is above a predetermined threshold.

17. A method as claimed in claim 12, further comprising:
averaging at least a portion of a plurality of virtual traffic flow paths to determine a normal traffic flow through the given location being the average of the virtual traffic flow paths.

18. A method as claimed in claim 12, further comprising:
determining that the geography at the given location increases the risk of accident if there is an obstacle within a predetermined distance of the given location.

19. A method as claimed in claim 12, wherein issuing the alert comprises issuing the alert to at least one of:
all vehicles within a predetermined threshold of the given location; and
all vehicles travelling towards the given location.

20. A method as claimed in claim 12, wherein issuing the alert comprises issuing the alert to a vehicle route guidance system, and wherein the alert comprises machine-readable instructions that, when executed by the route guidance system, cause the route guidance system to recalculate a route to a target destination that avoids the given location.

* * * * *